(12) United States Patent
Yu

(10) Patent No.: US 11,563,603 B2
(45) Date of Patent: Jan. 24, 2023

(54) VXLAN IMPLEMENTATION METHOD, NETWORK DEVICE, AND COMMUNICATIONS SYSTEM

(71) Applicant: Huawei Technologies Co., Ltd., Shenzhen (CN)

(72) Inventor: Bin Yu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 17/188,438

(22) Filed: Mar. 1, 2021

(65) Prior Publication Data

US 2021/0218599 A1 Jul. 15, 2021

Related U.S. Application Data

(63) Continuation of application No. 16/453,245, filed on Jun. 26, 2019, now Pat. No. 11,271,779.

(30) Foreign Application Priority Data

Jun. 26, 2018 (CN) .......................... 201810670379.5

(51) Int. Cl.
*H04L 12/46* (2006.01)
*H04L 41/0803* (2022.01)

(52) U.S. Cl.
CPC ...... *H04L 12/4675* (2013.01); *H04L 12/4645* (2013.01); *H04L 41/0803* (2013.01)

(58) Field of Classification Search
CPC ............. H04L 12/4666; H04L 12/4675; H04L 12/4679; H04L 12/4645; H04L 41/08; H04L 41/0803; H04L 41/0806
See application file for complete search history.

(56) References Cited

U.S. PATENT DOCUMENTS

2003/0037163 A1* 2/2003 Kitada ................. H04L 12/4645
709/236
2004/0221042 A1* 11/2004 Meier ................. H04L 12/4641
709/227
(Continued)

FOREIGN PATENT DOCUMENTS

CN 101087236 A 12/2007
CN 103095654 A 5/2013
(Continued)

OTHER PUBLICATIONS

Tianyi, H., "Research and Testing Method of VXLAN Technology," Xidian University, Dec. 2015, with an English abstract, 75 pages.
(Continued)

*Primary Examiner* — Kevin D Mew
(74) *Attorney, Agent, or Firm* — Conley Rose, P.C.

(57) ABSTRACT

A Virtual eXtensible Local Area Network (VXLAN) method comprises obtaining, by a network device, a mapping from a virtual local area network identifier VLAN ID to a VXLAN network identifier VNI; receiving, by the network device through a port, an Ethernet frame forwarded by an access device, where a VLAN tag field in the Ethernet frame includes the VLAN ID; adding, by the network device, a VXLAN header to the Ethernet frame based on the VLAN ID and the mapping to obtain a VXLAN packet, where a VNI field in the VXLAN header includes the VNI; and sending, by the network device, the VXLAN packet.

20 Claims, 17 Drawing Sheets

(56) References Cited

U.S. PATENT DOCUMENTS

| | | |
|---|---|---|
| 2006/0182118 A1 | 8/2006 | Lam et al. |
| 2007/0286217 A1 | 12/2007 | Miyata |
| 2009/0034431 A1* | 2/2009 | Nagarajan ............ H04W 12/084 370/254 |
| 2010/0290474 A1* | 11/2010 | Kaippallimalil .... H04L 12/4666 370/395.53 |
| 2011/0314517 A1 | 12/2011 | Yamato et al. |
| 2012/0173694 A1* | 7/2012 | Yan ..................... H04L 12/4641 709/223 |
| 2013/0091349 A1* | 4/2013 | Chopra .................. H04L 45/50 713/150 |
| 2013/0170490 A1 | 7/2013 | Kreeger et al. |
| 2013/0322453 A1 | 12/2013 | Allan |
| 2014/0029451 A1 | 1/2014 | Nguyen |
| 2014/0313892 A1 | 10/2014 | Kamble et al. |
| 2015/0063102 A1 | 3/2015 | Mestery et al. |
| 2015/0063353 A1 | 3/2015 | Kapadia et al. |
| 2015/0082418 A1 | 3/2015 | Gu |
| 2015/0180722 A1 | 6/2015 | Kapadia et al. |
| 2015/0188802 A1 | 7/2015 | Yoon et al. |
| 2015/0200848 A1 | 7/2015 | Janakiraman et al. |
| 2015/0249565 A1* | 9/2015 | Yamabe .................. H04L 47/35 370/254 |
| 2015/0373672 A1 | 12/2015 | Forssell |
| 2015/0381531 A1* | 12/2015 | Huang ................ H04L 12/4645 370/401 |
| 2016/0072642 A1* | 3/2016 | Shih .................... H04L 12/4666 370/392 |
| 2016/0094364 A1 | 3/2016 | Subramaniyam et al. |
| 2016/0094366 A1 | 3/2016 | Wang et al. |
| 2016/0127454 A1* | 5/2016 | Maheshwari ....... H04L 41/0803 709/223 |
| 2016/0149808 A1 | 5/2016 | Cai et al. |
| 2016/0241515 A1 | 8/2016 | Pai et al. |
| 2016/0323184 A1 | 11/2016 | Li et al. |
| 2017/0026417 A1 | 1/2017 | Ermagan et al. |
| 2018/0139073 A1 | 5/2018 | Han et al. |
| 2018/0159801 A1* | 6/2018 | Rajan ..................... H04L 45/66 |
| 2019/0013968 A1 | 1/2019 | Xie et al. |
| 2019/0037390 A1 | 1/2019 | Hooda et al. |
| 2019/0068496 A1 | 2/2019 | Tessmer et al. |
| 2019/0132322 A1 | 5/2019 | Song et al. |
| 2019/0141036 A1 | 5/2019 | Shi |
| 2019/0379572 A1 | 12/2019 | Yadav et al. |
| 2020/0044892 A1* | 2/2020 | Allan ..................... H04W 8/08 |
| 2021/0075618 A1* | 3/2021 | Stephenson ......... H04L 63/0846 |
| 2021/0144028 A1* | 5/2021 | Yu ........................... H04L 45/50 |

FOREIGN PATENT DOCUMENTS

| | | |
|---|---|---|
| CN | 103379010 A | 10/2013 |
| CN | 103873374 A | 6/2014 |
| CN | 104901835 A | 9/2015 |
| CN | 105939296 A | 9/2016 |
| CN | 106230749 A | 12/2016 |
| CN | 107104872 A | 8/2017 |
| CN | 107332812 A | 11/2017 |
| CN | 107404470 A | 11/2017 |
| EP | 2840743 A1 | 2/2015 |
| JP | 2006345302 A | 12/2006 |
| JP | 2007335945 A | 12/2007 |
| WO | 2011081104 A1 | 7/2011 |
| WO | 2017143903 A1 | 8/2017 |
| WO | 2017186181 | 11/2017 |
| WO | 2017198163 A1 | 11/2017 |

OTHER PUBLICATIONS

ETSI GS NGP 001 V1.2.1, "Next Generation Protocols (NGP); Scenario Definitions," May 2017, 126 pages.

IEEE Std 802.1X™-2010 IEEE Standard for Local and metropolitan area networks—Port-Based Network Access Control, IEEE Computer Society, Approved 2, Feb. 5, 2010, 222 pages.

Hewlett Packard Enterprise Development, "LP 802.1X support for VXLANs," 2017, retrieved from:https://techhub.hpe.com/eginfolib/networking/docs/switches/5950/5200-4026_security_cg/content/499795815.htm, 1 page.

"HPE FlexFabric 5950 Switch Series Security Configuration Guide," Hewlett Packard Enterprise Development LP, 2017, Document version: 6W100-20171130, URL, https://techhub.hpe.com/eginfolib/networking/docs/switches/5950/5200-4026_security_cg/content/, 1 page.

* cited by examiner

VXLAN IMPLEMENTATION METHOD, NETWORK DEVICE, AND COMMUNICATIONS SYSTEM

CROSS-REFERENCE TO RELATED APPLICATIONS

This application is a continuation of U.S. patent application Ser. No. 16/453,245, filed on Jun. 26, 2019, which claims priority to Chinese Patent Application No. 201810670379.5, filed on Jun. 26, 2018, all of which are hereby incorporated by reference in their entireties.

TECHNICAL FIELD

This application relates to the field of computers and communications technologies, and in particular, to a Virtual eXtensible Local Area Network (VXLAN) implementation method, a network device, and a communications system.

BACKGROUND

In a VXLAN, a device implementing a VXLAN packet encapsulation or decapsulation function is referred to as a VXLAN tunnel end point (VTEP). The VTEP encapsulates a layer 2 packet into a transport layer protocol (for example, User Datagram Protocol (UDP)) packet to implement VXLAN packet encapsulation. The VTEP may be a server, or may be a network device (for example, a switch or a router).

In a campus network, terminal devices generally do not support a VXLAN. Therefore, the function of the VTEP is implemented by an access device. However, there are many access devices in the campus network. If all the access devices are required to support a VXLAN, overall deployment costs in the campus network are excessively high.

SUMMARY

This application provides a VXLAN implementation method, to reduce overall deployment costs of a VXLAN in a campus network.

According to a first aspect, a VXLAN implementation method is provided. The method includes the following. A network device obtains a mapping from a Virtual Local Area Network (VLAN) identifier (ID) to a VXLAN network identifier (VNI). The network device receives, through a port, an Ethernet frame forwarded by an access device. A VLAN tag field in the Ethernet frame includes the VLAN ID. The network device adds a VXLAN header to the Ethernet frame based on the VLAN ID and the mapping to obtain a VXLAN packet. A VNI field in the VXLAN header includes the VNI. The network device sends the VXLAN packet.

In this application, a VTEP device is the network device connected to the access device. In other words, the VTEP device is a device farther from a terminal device than the access device. Usually, there are fewer devices farther from the terminal device. In this solution, the access device does not need to support a VXLAN, and only a relatively small quantity of network devices need to support a VXLAN such that a large quantity of access devices in a campus network that do not support a VXLAN can still be used. Therefore, deployment costs of a VXLAN technology in the campus network are relatively low. However, because the network device is not directly connected to the terminal device, making it difficult to directly select the VNI for the Ethernet frame, the access device selects the VLAN ID for the Ethernet frame from the terminal device, and the network device stores the mapping from a VLAN ID to a VNI. After receiving the Ethernet frame from the access device, the network device adds the corresponding VXLAN header to the Ethernet frame based on the mapping from a VLAN ID to a VNI to obtain the VXLAN packet, thereby implementing a VXLAN.

If the access device serves as an authenticator, in an authentication process, the network device obtains no VLAN ID authorized by an authentication server. To ensure normal forwarding of an Ethernet frame in a network, a port that is on the network device and that is connected to the access device needs to be added (add) to an authorized VLAN of a terminal device that accesses a network using the access device. In an implementation process, there are a plurality of specific adding manners. For example, the port on the network device is added to all VLANs.

In a possible implementation of the first aspect, another manner of adding a port to an authorized VLAN of a terminal device by the network device is provided. In an embodiment, the method further includes the following. The network device receives an adding instruction from the access device through the port. The adding instruction includes the VLAN ID. The network device adds the port to a VLAN identified by the VLAN ID. In this manner of adding the port on the network device to the VLAN, a range of a broadcast domain can be controlled, thereby improving security.

In another possible implementation of the first aspect, the adding instruction is a first Locator/Identifier Separation Protocol (LISP).

Optionally, the first LISP packet further carries a first packet type indicator, and the first packet type indicator indicates that the first LISP packet includes the VLAN ID. With the packet type indicator, the network device can efficiently identify a purpose of the LISP packet, in other words, identify a type of information included in the LISP packet, to perform corresponding processing.

In another possible implementation of the first aspect, the method further includes the following. The network device receives a first authentication packet from the access device through the port. The first authentication packet is used in authentication for a supplicant device. The network device records a correspondence between the port and a supplicant device address in the first authentication packet. The network device receives a second authentication packet from an authentication server. The second authentication packet includes the supplicant device address and the VLAN ID. The network device adds the port to a VLAN identified by the VLAN ID, based on the supplicant device address and the VLAN ID in the second authentication packet and the recorded correspondence between the supplicant device address and the port. In this manner, the network device actually serves as an authenticator device such that a large quantity of access devices closer to a terminal device do not need to support an authentication function. Therefore, simpler and lower-cost hardware can be used for implementation, thereby reducing deployment costs.

In another possible implementation of the first aspect, the network device sends a binding instruction to the access device. The binding instruction includes the supplicant device address and the VLAN ID. With the binding instruction, the access device adds a port connected to a terminal device to an authorized VLAN of the terminal device, and adds a proper VLAN ID to a subsequent Ethernet frame sent by the terminal device.

Optionally, the first authentication packet is encapsulated into a first LISP packet, the first LISP packet further carries a first packet type indicator, and the first packet type indicator indicates that the first LISP packet carries the authentication packet. The binding instruction is a second LISP packet, the second LISP packet further includes a second packet type indicator, and the second packet type indicator indicates that the second LISP packet includes a media access control (MAC) address and a VLAN ID of the terminal device.

According to a second aspect, a VXLAN implementation method is provided. The method includes the following. An authenticator device obtains a VLAN ID allocated by an authentication server to an authenticated supplicant device. The authenticator device sends an LISP packet to a VXLAN tunnel end point VTEP device. The LISP packet includes the VLAN ID. The authenticator device and the VTEP device are implemented by different devices. For example, the authenticator device is an access device, and the VTEP device is a network device connected to the access device. The authenticator device sends the VLAN ID of the supplicant device to the VTEP device after authentication succeeds such that the VTEP device adds a port of the VTEP device to a specified VLAN, to control a range of a broadcast domain and improve security.

In a possible implementation, the method further includes the following. The authenticator device determines a port connected to a MAC address of the supplicant device. The authenticator device sets a value of a default VLAN of the port to the VLAN ID. The authenticator device receives an Ethernet frame from the supplicant device through the port. The authenticator device adds a VLAN tag including the VLAN ID to the Ethernet frame based on the default VLAN of the port, and then forwards the Ethernet frame. The authenticator device adds the VLAN ID to the VLAN tag in the Ethernet frame such that the VTEP device obtains a mapped VNI based on the VLAN ID in the VLAN tag in the Ethernet frame, and adds a VXLAN header to the Ethernet frame, to implement a VXLAN.

In a possible implementation, the LISP packet further includes a packet type indicator, and the packet type indicator is used to instruct the VTEP device to add a port receiving the LISP packet to a VLAN identified by the VLAN ID. With the packet type indicator, the network device can efficiently identify a purpose of the LISP packet, in other words, identify a type of information included in the LISP packet, to perform corresponding processing.

According to a third aspect, a VXLAN implementation method is further provided. The method includes the following. An access device receives an authentication packet from a terminal device through a port. The terminal device is a to-be-authenticated supplicant device. The access device records a correspondence between the port and a MAC address, in the authentication packet, of the supplicant device. The access device sends the authentication packet to a network device. The network device is an authenticator device and a VXLAN tunnel end point VTEP device. The access device receives a binding instruction from the network device. The binding instruction includes the MAC address of the supplicant device and a VLAN ID. The access device sets a value of a default VLAN of the port to the VLAN ID based on the correspondence and the MAC address, in the binding instruction, of the supplicant device. In this solution, the network device connected to the access device serves as both the authenticator device and the VTEP device, the access device forwards the authentication packet between the authenticator device and the to-be-authenticated supplicant device, and after authentication succeeds, the access device adds the port connected to the supplicant device to an authorized VLAN according to the binding instruction, to control access of the supplicant device based on the authorized VLAN.

In a possible implementation, the method further includes the following. The access device receives an Ethernet frame from the terminal device through the port. A source address of the Ethernet frame is the MAC address of the supplicant device. The access device adds a VLAN tag including the VLAN ID to the Ethernet frame based on the default VLAN of the port, and then forwards the Ethernet frame. The access device adds the VLAN ID to the VLAN tag in the Ethernet frame such that the VTEP device obtains a mapped VNI based on the VLAN ID in the VLAN tag in the Ethernet frame, and adds a VXLAN header to the Ethernet frame, to implement a VXLAN.

In a possible implementation, that the access device sends the authentication packet to a network device includes the following. The access device encapsulates the authentication packet using a first LISP packet, and the access device sends the first LISP packet to the network device. The authentication packet between the access device and the network device is encapsulated using the LISP packet, thereby providing a feasible manner for packet authentication through transparent transmission.

In a possible implementation, the first LISP packet further carries a first packet type indicator, and the first packet type indicator indicates that the first LISP packet carries the authentication packet.

In a possible implementation, the binding instruction is a second LISP packet, the second LISP packet further includes a second packet type indicator, and the second packet type indicator indicates that the second LISP packet includes the MAC address of the terminal device and the VLAN ID. When an LISP packet can carry various types of information to implement a plurality of purposes, with the packet type indicator, the network device can efficiently identify a purpose of a received LISP packet, in other words, identify a type of information included in the received LISP packet, to perform corresponding processing.

According to a fourth aspect, a network device is provided. The network device is connected to an access device. The network device includes a memory, a port, and at least one processor. The memory is configured to store program code.

The at least one processor is configured to perform the method in any one of the first aspect or the possible implementations of the first aspect after reading the program code stored in the memory. For details, refer to the foregoing detailed description. Details are not described herein again.

According to a fifth aspect, an access device is provided. The access device includes a memory, a port, and at least one processor. The memory is configured to store program code.

The at least one processor is configured to perform the method in any one of the second aspect or the possible implementations of the second aspect or perform the method in any one of the third aspect or the possible implementations of the third aspect after reading the program code stored in the memory. For details, refer to the foregoing detailed description. Details are not described herein again.

According to a sixth aspect, a VXLAN implementation apparatus is provided, to perform the method in any one of the first aspect or the possible implementations of the first aspect, or perform the method in any one of the second aspect or the possible implementations of the second aspect, or perform the method in any one of the third aspect or the possible implementations of the third aspect. The VXLAN implementation apparatus includes a unit configured to perform the method in any one of the first aspect or the possible implementations of the first aspect, or includes a unit configured to perform the method in any one of the second aspect or the possible implementations of the second aspect, or includes a unit configured to perform the method in any one of the third aspect or the possible implementations of the third aspect. These units may be implemented by a program module, or may be implemented by hardware or firmware.

According to a seventh aspect, this application provides a computer-readable storage medium. The computer-readable storage medium is configured to store a computer software instruction to be used by the foregoing network device, and when the computer software instruction runs on a computer, the computer performs the method in any one of the first aspect or the possible implementations of the first aspect. Alternatively, the computer-readable storage medium is configured to store a computer software instruction to be used by the foregoing access device, and when the computer software instruction runs on a computer, the computer performs the method in any one of the second aspect or the possible implementations of the second aspect, or the computer performs the method in any one of the third aspect or the possible implementations of the third aspect.

According to an eighth aspect, a computer program product including an instruction is provided. When the instruction runs on a computer, the computer performs the method in each of the foregoing aspects.

According to a ninth aspect, a communications system is provided. The system includes an access device and a network device connected to the access device. The network device is configured to perform the method in any one of the first aspect or the possible implementations of the first aspect.

In a possible implementation, the access device is configured to perform the method in any one of the second aspect or the possible implementations of the second aspect.

In a possible implementation, the access device is configured to perform the method in any one of the third aspect or the possible implementations of the third aspect.

BRIEF DESCRIPTION OF DRAWINGS

To describe technical solutions in embodiments of this application more clearly, the following briefly describes accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

If a function of a VTEP is implemented on an access device, the access device is required to have a relatively high hardware configuration, for example, required to have a chip with a programming capability. In addition, there are a relatively large quantity of access devices. Therefore, deployment costs of such a VXLAN solution of implementing the function of the VTEP using the access device are excessively high. Based on this, it is necessary to seek another solution to implement a VXLAN in a campus network.

If the VTEP is implemented using a network device other than the access device, there are some technical problems. For example, in a solution, a network device connected to the access device implements the function of the VTEP. However, in this solution, it is a problem for the network device in the campus network to select a proper VNI for an Ethernet frame.

For the foregoing problems, embodiments of this application provide a VXLAN implementation solution. In this solution, a network device supporting a VXLAN protocol implements a VTEP. The network device obtains a mapping between a VLAN ID and a VNI. Subsequently, when receiving an Ethernet frame from an access device, the network device obtains a VLAN ID from a VLAN tag field in the Ethernet frame. The network device adds a VXLAN header to the Ethernet frame based on the VLAN ID obtained from the Ethernet frame and the mapping between a VLAN ID and a VNI to obtain a VXLAN packet. A VNI field in the VXLAN header includes the VNI to which the VLAN ID in the Ethernet frame is mapped. The network device sends the VXLAN packet. In the embodiments of this application, for simple and clear differentiation, a field that is in a VXLAN packet header and that is used to fill in a VNI is referred to as a "VNI field". In another case, a VNI is a VNI represented by a 24-bit binary value. In this solution, the network device implements a function of the VTEP, and access device hardware in a campus network does not need to be upgraded to a switch supporting a VXLAN, thereby reducing deployment costs. Further, a terminal can access a network anytime and anywhere using a large quantity of access devices in the campus network that do not have a VXLAN function, and is not necessarily limited to a location for accessing the network, thereby ensuring use convenience of the terminal device.

Main implementation principles and specific implementations of technical solutions in the embodiments of the present disclosure and beneficial effects that can be correspondingly achieved by the technical solutions are described below in detail with reference to accompanying drawings.

Figure 1:
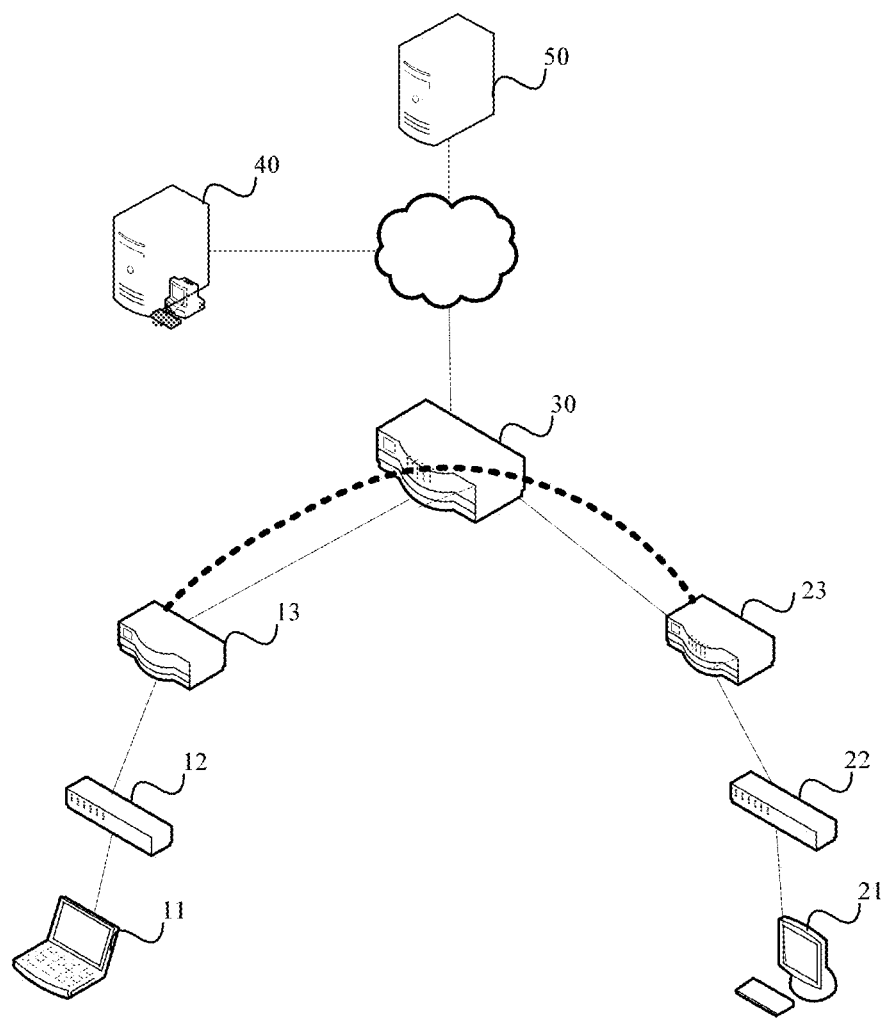
FIG. 1 is a schematic diagram of an application scenario of a VXLAN implementation method according to an embodiment of this application.

FIG. 1 is a schematic diagram of an application scenario of a VXLAN implementation method according to an embodiment of this application. The method is applied to a campus network. The campus network includes terminal devices such as a terminal 11 and a terminal 21, access devices such as an access device 12 and an access device 22, and network devices such as a network device 13 and a network device 23. Optionally, depending on a network scale and an actual requirement, the campus network further includes a core device 30, a network management device 40, and an authentication server 50. The terminal 11 accesses a network using the access device 12. The network device 13 aggregates data streams from the access device 12, and then sends the data streams to the core device 30. The core device 30 is connected to the network management device 40 and the authentication server 50 through the Internet. The terminal 21 accesses the network using the access device 22. The network device 23 aggregates data streams from the access device 22, and then sends the data streams to the core device 30. A VXLAN tunnel exists between the network device 13 and the network device 23, as shown by a thick dashed line in FIG. 1.

The terminal device in this embodiment of this application has a network connection capability, including but not limited to, a personal computer, a printer, a mobile phone, a server, a notebook computer, an Internet Protocol (IP) phone, a camera, a tablet computer, a wearable device, and the like.

The access device in this embodiment of this application is a switch or a wireless access point (AP). Unless particularly specified otherwise, the switch in this embodiment of this application is a switch that does not support the VXLAN protocol.

The network device in this embodiment of this application is a layer 3 switch or router, and the network device supports the VXLAN protocol.

The network management device in this embodiment of this application is a system for network configuration. A network manager may manage the network using a remote terminal protocol (Telnet), a management information base (MIB), yet another next generation (YANG), or the like. Alternatively, when no dedicated network management device is configured in the network, the network manager may directly log in to the terminal device, the access device, the network device, and the core device to configure addresses, ports, network connection parameters, and the like of these devices.

The authentication server is configured to attempt to authenticate a terminal device requesting to access the network, and open up a network service for the terminal device based on an authentication result. In this embodiment of this application, after authenticating an online terminal device based on data such as an address and registration information of the terminal device, the authentication server allocates authorization information to the terminal device. The authorization information includes a VLAN ID. Optionally, the authorization information further includes a group identifier (Group ID). Optionally, the authentication server is an authentication, authorization, and accounting (AAA) server. Based on the VLAN ID, the network device can control a range of a layer 2 broadcast domain, to improve network security. Based on the group identifier and a group policy that is configured by the network management device, access between different groups can be controlled. For example, the group policy includes a matching condition and a control action, and the matching condition includes one or more group identifiers. In one group policy, a matching condition is from a group A to a group B, and a control action is allowing access, in another group policy, a matching condition is from the group B to a group C, and a control action is forbidding access.

In the scenario shown in FIG. 1, the network device implements a VTEP, the VXLAN tunnel exists between the network device 13 and the network device 23, and a packet between the terminal 11 and the terminal 21 is transmitted through the VXLAN tunnel. A principle of implementing a function of the VTEP by the network device is described below with reference to FIG. 1 and FIG. 2.

Figure 2:
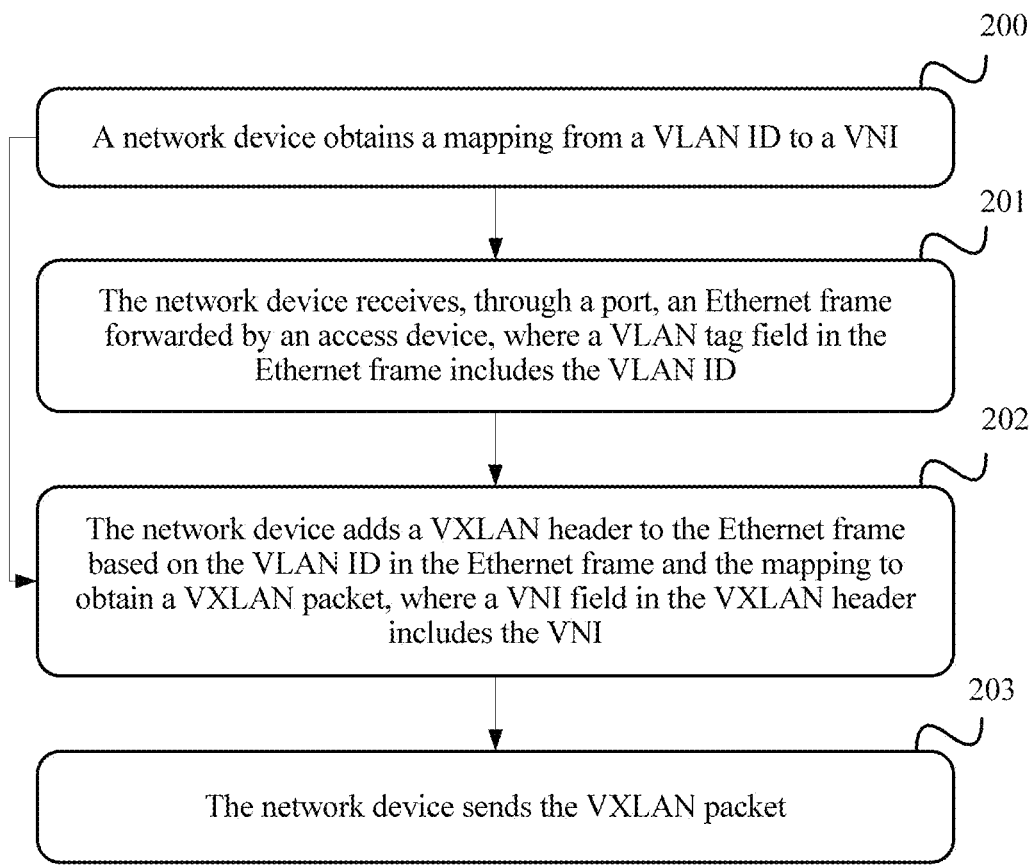
FIG. 2 is a flowchart of a VXLAN implementation method according to an embodiment of this application.

FIG. 2 is a flowchart of a VXLAN implementation method according to an embodiment of this application. FIG. 2 mainly describes, from a perspective of a network device, a principle of implementing a VTEP by the network device. It may be understood that, the network device in FIG. 2 may be the network device 13 or the network device 23 in FIG. 1. A procedure shown in FIG. 2 includes step 200 to step 203.

Step 200: The network device obtains a mapping from a VLAN ID to a VNI.

A VLAN tag field in an Ethernet frame may include a 12-bit VLAN ID. The VLAN ID is used to divide a layer 2 network into a plurality of different broadcast domains. Neither broadcast traffic nor unicast traffic in one VLAN is forwarded to another VLAN. Division based on a switch port is a common VLAN division manner. Different ports on a switch are separately configured to correspond to different VLANs. For example, four ports on a switch correspond to a VLAN 10, and another port corresponds to a VLAN 20. In a VXLAN technology, the layer 2 network is segmented using a 24-bit VNI, to transmit layer 2 data in a layer 3 network. Communication cannot be directly performed between layer 2 networks indicated by different VNIs.

The mapping from a VLAN ID to a VNI may be manually configured on the network device. Alternatively, the network device may receive the mapping from a VLAN ID to a VNI from another device (for example, a controller). For example, the network device is the network device 13 in FIG. 1. A network manager may directly log in to a command-line interface provided by an operating system of the network device 13, and configure the mapping from a VLAN ID to a VNI on the network device 13. Optionally, the mapping from a VLAN ID to a VNI is shown in Table 1.

TABLE 1

| VLAN ID | VNI |
| --- | --- |
| VLAN 10 | VNI 1000 |
| VLAN 20 | VNI 2000 |
| . . . | . . . |

Step 201: The network device receives, through a port, an Ethernet frame forwarded by an access device, where a VLAN tag field in the Ethernet frame includes the VLAN ID. The Ethernet frame includes a source address field, a destination address field, and a VLAN tag protocol identifier field. In this application, the VLAN tag protocol identifier field is referred to as a VLAN tag field. Because the Ethernet frame is a layer 2 frame, the source address field and the destination address field in the Ethernet frame in this application each include a MAC address. The Ethernet frame further includes another field (for example, a type field or a length field) and a data portion. For example, the data portion is a layer 3 protocol data unit. For a Transmission Control Protocol/Internet Protocol (TCP/IP) protocol family, the layer 3 protocol data unit is an IP data packet.

Step 202: The network device adds a VXLAN header to the Ethernet frame based on the VLAN ID in the Ethernet frame and the mapping to obtain a VXLAN packet, where a VNI field in the VXLAN header includes the VNI.

Step 203: The network device sends the VXLAN packet.

The scenario shown in FIG. 1 is still used as an example. After getting online, the terminal 11 can access a network only after completing an authentication process. Before the terminal 11 is authenticated, the access device 12 connected to the terminal 11 allows only an authentication packet related to the terminal 11 to be forwarded. If authentication succeeds, the authentication server authorizes the terminal 11, and instructs the access device 12 to change a state of a port connected to the terminal 11 from "uncontrolled" to "controlled". After the authentication succeeds, the controlled port that is on the access device 12 and that is connected to the terminal 11 may forward an Ethernet frame from the terminal 11 or forward an Ethernet frame to the terminal 11 such that the terminal 11 can access the network. After the authentication succeeds, the authentication server may further configure other authorization information for the terminal 11, for example, allocate a VLAN ID and a group identifier to the terminal 11, to control network access behavior of the terminal 11 using the VLAN ID and the group identifier. After the terminal 11 is authenticated and authorized, the access device 12 generates, in a user information table (shown in Table 3 below), an entry related to the terminal 11.

After the terminal 11 is authenticated, the access device 12 receives an Ethernet frame sent by the terminal 11, and based on a number of a port receiving the Ethernet frame, finds, in the user information table (shown in Table 3 below) stored on the access device 12, the VLAN 10 corresponding to the terminal 11. The access device 12 adds the VLAN 10 to the Ethernet frame sent by the terminal 11. Optionally, the access device 12 adds the VLAN 10 to a VLAN tag field in the Ethernet frame. The access device 12 sends, to the network device 13, the Ethernet frame to which the VLAN 10 is added.

After receiving the Ethernet frame, based on the VLAN 10 in the Ethernet frame, the network device 13 finds, in the mapping shown in Table 1 from a VLAN ID to a VNI, a VNI 1000 to which the VLAN 10 is mapped. The network device 13 performs VXLAN encapsulation on the received Ethernet frame. In an encapsulation process, the found VNI 1000 is written to the VNI field in the VXLAN header. The network device 13 sends a packet obtained after encapsulation to the network device 23 through the VXLAN tunnel.

Figure 4:
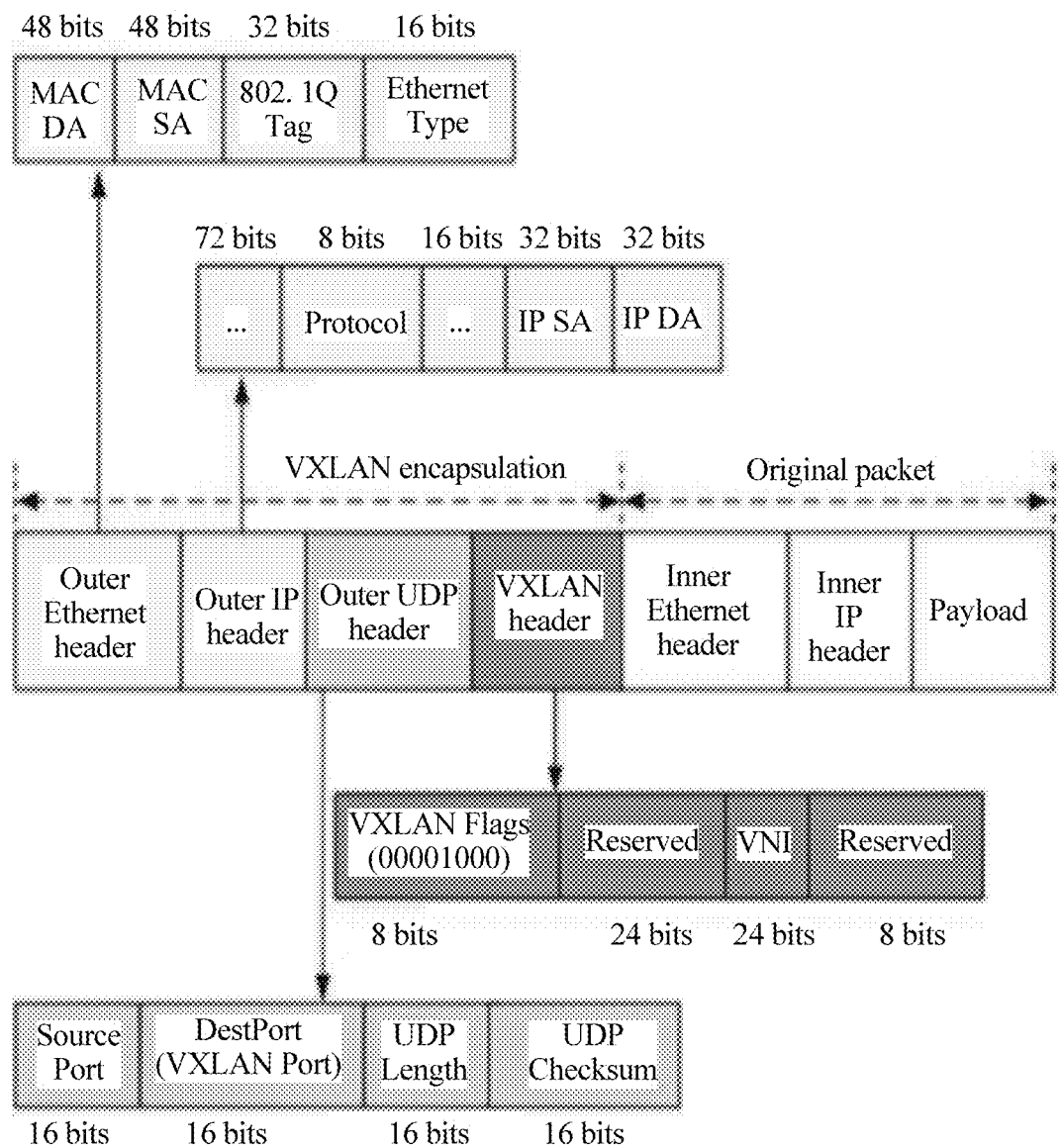
FIG. 4 is a schematic diagram of VXLAN encapsulation according to an embodiment of this application.

FIG. 4 is a schematic diagram of performing VXLAN encapsulation on an Ethernet frame by the network device 13. During VXLAN encapsulation, a VXLAN header, an outer UDP header, and an outer IP header are sequentially added to the received Ethernet frame. The Ethernet frame includes an Ethernet frame header and a data portion. For example, the data portion is an IP packet. A source address in the Ethernet frame header is a MAC address of the terminal 11, and a destination address is a MAC address of the terminal 21. A source address in an IP packet header is an IP address of the terminal 11, and a destination address is an IP address of the terminal 21.

A source address in an outer Ethernet header is a MAC address of the network device 13, and a destination address is a MAC address of the network device 23. A source address in the outer IP header is an IP address of the network device 13, and a destination address is an IP address of the network device 23.

In the VXLAN implementation method provided in this embodiment of this application, a terminal device accesses a network using the access device, and the network device that is connected to the access device and that supports the VXLAN protocol implements a VTEP. The mapping from a VLAN ID to a VNI is configured on the network device. Subsequently, after receiving the Ethernet frame from the access device, the network device adds the VXLAN header to the Ethernet frame based on the mapping from a VLAN ID to a VNI and the VLAN ID in the Ethernet frame to obtain the VXLAN packet. The VXLAN header includes the VNI corresponding to the VLAN ID in the Ethernet frame. In this solution, the access device does not need to support a VXLAN, a large quantity of existing layer 2 switches or APs can still be used in a campus network, and access device hardware in the campus network does not need to be upgraded to a switch supporting a VXLAN, thereby reducing deployment costs.

In step 201, after the network device receives the Ethernet frame sent by the access device, to send response data that is from the network and that corresponds to the Ethernet frame to the terminal device, the network device needs to add the port that is on the network device and that is connected to the access device to an authorized VLAN of the terminal (which is a VLAN identified by the VLAN ID in the authorization information generated by the authentication server for the terminal device after the terminal device is authenticated). Ports that are on the access device and the network device and that are related to the terminal device are added to the authorized VLAN such that it can be ensured that the terminal device can access the network using an access device at any location in the campus network, the terminal does not need to access the network using a particular access device or through a particular port on an access device, thereby ensuring use convenience of the terminal device.

Optionally, the port on the network device may be added to the authorized VLAN of the terminal using a plurality of methods. For example, the port on the network device is added to all VLANs. Alternatively, a process of interaction between the access device and the network device may be improved, and after the terminal is authenticated and authorized, the port on the network device is added to the authorized VLAN of the terminal. The former solution is characterized by simplicity and convenience, and no process of interaction between the access device and the network device is required. However, adding the port to all the VLANs leads to an excessively large broadcast domain, and lowers network security.

The following describes two specific manners of improving a process of interaction between an access device and a network device to add a port on the network device to an authorized VLAN of a terminal.

For ease of understanding a process of packet exchange between an access device and a network device to be described below, an authentication process is briefly described first. The packet exchange process to be described below is associated with the authentication process. Terminal device authentication is intended to prevent an unauthorized terminal device from accessing a network, for example, a local area network or a wide area network, through an access port to obtain services provided by the network. Three roles, a to-be-authenticated supplicant, an authenticator, and an authentication server are generally involved in the authentication process. In the authentication process, the to-be-authenticated supplicant is a terminal device, the authenticator is an access device, and the authentication server is a server, for example, an AAA server. For simplicity and clarity, in this embodiment of this application, only the Extensible Authentication Protocol (EAP) is used as an example for a simplified description of the process of packet exchange between the access device and the network device. When the terminal device and a network side perform an authentication procedure specified in another standard, a process, based on the authentication procedure, of information exchange between the access device and the network device is similar thereto. Processes are not enumerated.

Figure 3A:
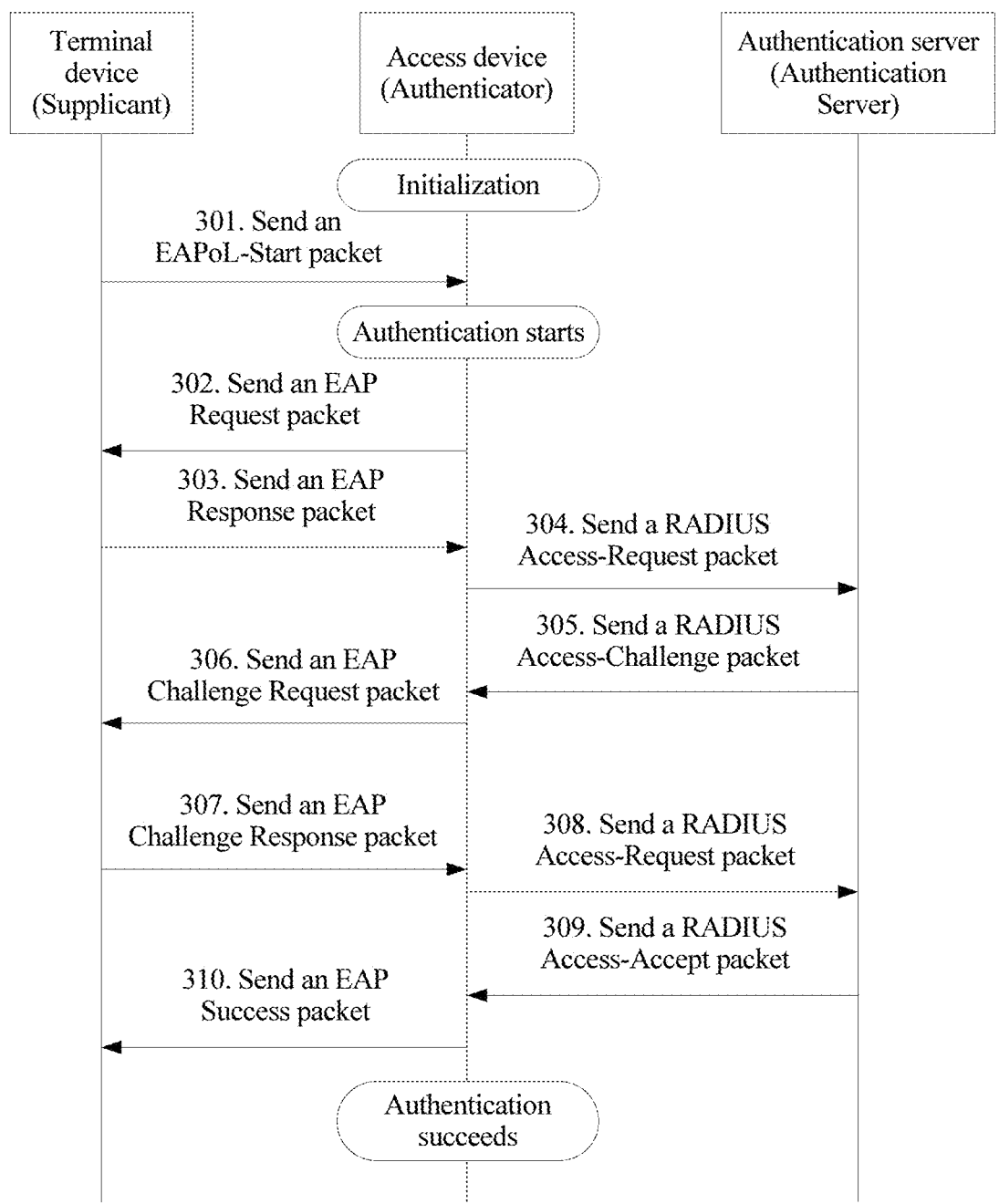
FIG. 3A is a schematic diagram of an authentication process specified for port-based network access control in an embodiment of this application.

An EAP authentication process is shown in FIG. 3A. Before an access device performs authentication, a port for connecting a terminal device to the access device is in an uncontrolled state, and allows only an EAP packet to pass through. After the authentication succeeds, other data of the terminal device can be transmitted through the port of the access device. The authentication process mainly includes step 301 to step 310.

Step 301: The terminal device sends an Extensible Authentication Protocol over local area network (EAPoL)-Start packet to initiate an authentication process.

Step 302: After receiving the EAPoL-Start packet, the access device sends an EAP Request packet to the terminal device, to request the terminal device to send a user identifier. In addition, the access device creates a new entry in a user information table. The entry records a number of a port receiving the EAPoL-Start packet, and information in the EAPoL-Start packet, such as a MAC address of the terminal device and a user name.

Step 303: The terminal device generates an EAP Response packet, encapsulates the user identifier into the EAP Response packet, and sends the EAP Response packet to the access device.

Step 304: The access device encapsulates the received EAP Response and some attribute information of the access device, for example, information such as a network access server (NAS) IP address and a NAS port number, into a Remote Authentication Dial In User Service (RADIUS) Access-Request packet, and sends the RADIUS Access-Request packet to an authentication server.

Step 305: After receiving the RADIUS Access-Request packet, the authentication server extracts the user identifier and searches a database. If the user identifier is not found, the packet is directly discarded. If the user identifier exists, the authentication server extracts information such as a user password, and performs MD5 encryption using a randomly generated encryption word, to generate a cipher. In addition, the authentication server encapsulates the random encryption word into an EAP Challenge Request packet, then encapsulates the EAP Challenge Request packet into an EAP-Message attribute of a RADIUS Access-Challenge packet, and sends the RADIUS Access-Challenge packet to the access device.

Step 306: After receiving the RADIUS Access-Challenge packet, the access device sends, to the terminal device, the EAP Challenge Request packet that is encapsulated into the RADIUS Access-Challenge packet.

Step 307: The terminal device performs, using a random encryption word sent by the authentication server, a same MD5 encryption operation on information such as a locally stored user identifier and password to generate a cipher, encapsulates the cipher into an EAP Challenge Response packet, and sends the EAP Challenge Response packet to the access device.

Step 308: After receiving the EAP Challenge Response packet, the access device encapsulates the EAP Challenge Response packet into an EAP-Message attribute of a RADIUS Access-Request packet, and sends the RADIUS Access-Request packet to the authentication server.

Step 309: The authentication server performs decapsulation, and compares the cipher returned by the terminal device with a cipher that is generated by the authentication server in step 305. If the two ciphers are inconsistent, authentication fails, and the authentication server returns a RADIUS Access-Reject message, and keeps a port in a closed state. If the two ciphers are consistent, authentication succeeds, and the authentication server encapsulates an EAP Success packet into an attribute of a RADIUS Access-Accept packet, and sends the RADIUS Access-Accept packet to the access device. In addition, the RADIUS Access-Accept packet further carries other authorization information, for example, information such as a VLAN ID and a group identifier.

Step 310: After receiving a RADIUS Access-Accept sent by the authentication server, the access device changes a state of a port to "controlled", extracts an EAP Success packet from the RADIUS Access-Accept, and sends the EAP Success packet to the terminal device. In addition, the access device adds, to the newly created entry in the user information table, the authorization information including the VLAN ID and the group identifier.

In this embodiment of this application, it is assumed that the VLAN ID allocated by the authentication server to the terminal 11 is the VLAN 10.

To help the network device 13 to conveniently add the port connected to the access device 12 to the authorized VLAN of the terminal 11, an interaction manner used by the network device 13 and the access device 12 includes but is not limited to the following manner 1 and manner 2.

Manner 1: The network device receives an adding instruction from the access device through the port. The adding instruction includes the VLAN ID. The network device adds the port to a VLAN identified by the VLAN ID.

Figure 3B:
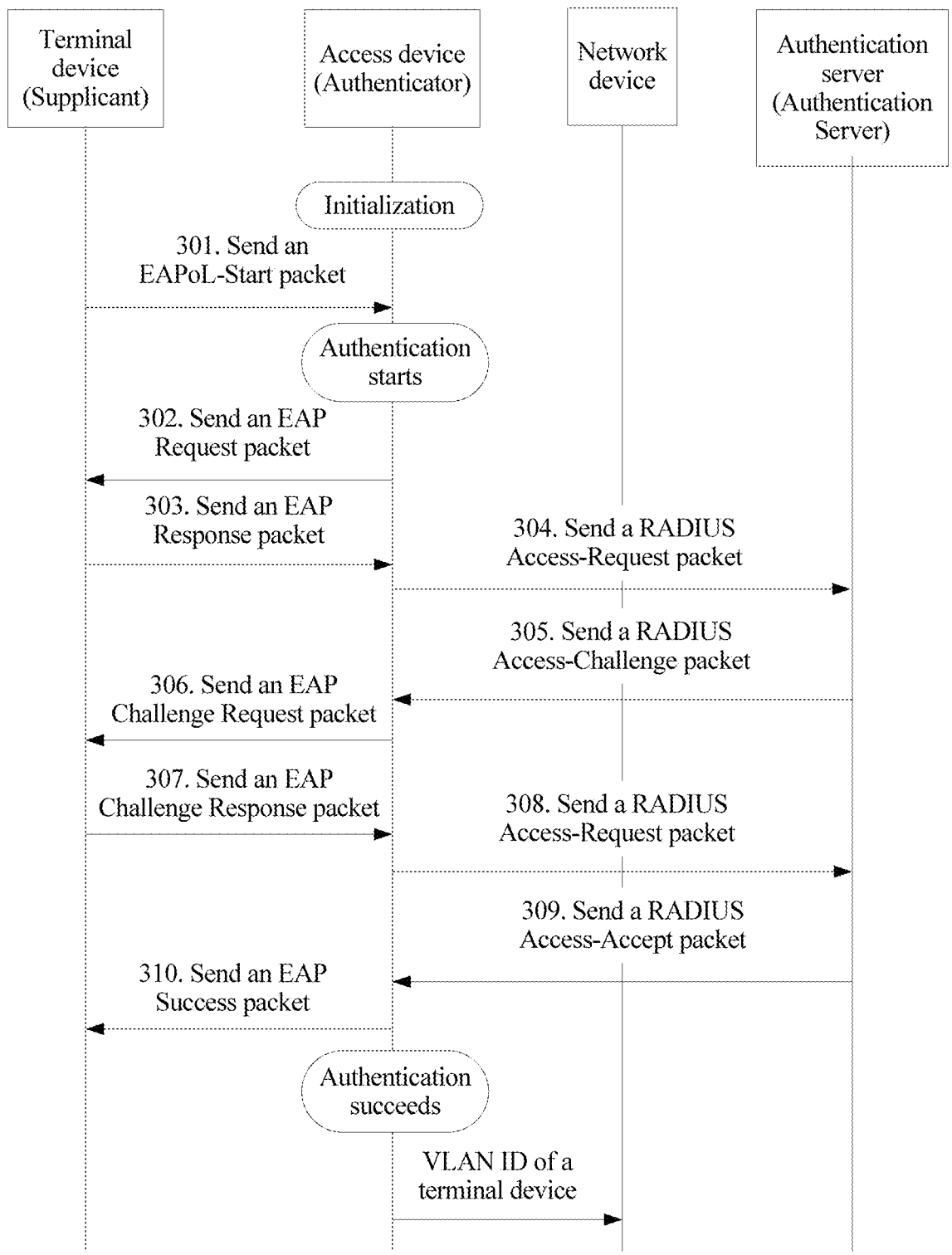
FIG. 3B is a schematic diagram of a first manner of obtaining a VLAN ID of a terminal 11 by a network device according to an embodiment of this application.

In the manner 1, an authenticator device is the access device 12, and an authentication process is shown in FIG. 3A. After authentication succeeds, the access device 12 obtains a VLAN ID allocated by the authentication server to an authenticated supplicant device. The access device 12 sends the adding instruction to the network device 13 using a control plane protocol between the access device 12 and the network device 13, as shown in FIG. 3B. The adding instruction includes the VLAN 10. After receiving the adding instruction through a port indicated by a port number E1/0/0 (referred to as a port E1/0/0 below), the network device 13 adds the port E1/0/0 to the VLAN 10.

The control plane protocol may be a newly defined protocol, or may be implemented by making some extensions to an existing protocol, for example, implemented by extending LISP. An example of an extension manner is given in the following embodiments.

In the manner 1, the access device serves as an authenticator device, and after the terminal device is authenticated, the access device notifies the network device of the authorized VLAN ID of the terminal device using the adding instruction such that an existing network authentication procedure is only slightly modified, and implementation costs are relatively low.

Manner 2: An authenticator device is the network device 13. The access device forwards authentication packets between the to-be-authenticated supplicant device and the authenticator device, in an embodiment, sends, to the authenticator device, an authentication packet sent by the terminal device, and sends, to the terminal device, an authentication packet sent by the authenticator device. The network device receives a first authentication packet from the access device through the port. The first authentication packet provides authentication for the supplicant device. The network device records a correspondence between the port (which is a port receiving the first authentication packet) and a supplicant device address in the first authentication packet. The network device receives a second authentication packet from the authentication server. The second authentication packet includes the supplicant device address and the VLAN ID. The network device adds the port to the VLAN identified by the VLAN ID, based on the supplicant device address and the VLAN ID in the second authentication packet and the recorded correspondence between the port and the supplicant device address.

Figure 3C:
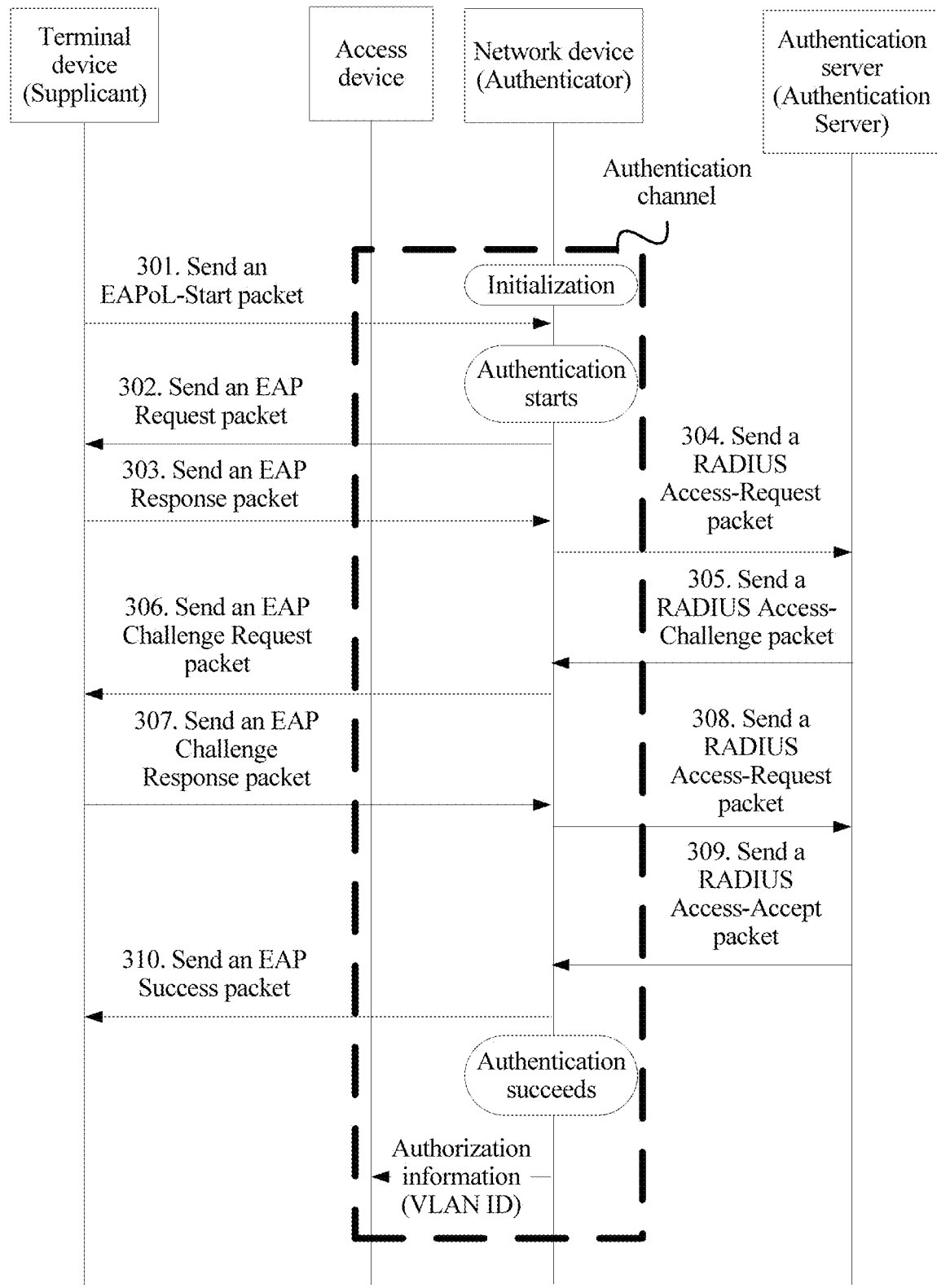
FIG. 3C is a schematic diagram of a second manner of obtaining a VLAN ID of a terminal 11 by a network device according to an embodiment of this application.

As shown in FIG. 3C, the IP address of the network device 13 is configured on the access device 12. The access device 12 and the network device 13 transmit authentication packets based on a control plane protocol. The control plane protocol may be a newly defined protocol, or may be implemented by making some extensions to an existing protocol, for example, implemented by extending LISP. An example of an extension manner is given in the following embodiments. An authentication channel is actually a particular manner used to encapsulate a packet.

After the terminal 11 gets online and an authentication process of the terminal 11 is triggered, the access device 12 receives a first authentication packet (for example, an EAPoL-Start packet) sent by the terminal, and creates a new entry in a user information table (or a forwarding table). The entry records the MAC address of the terminal 11 (a to-be-authenticated supplicant device) in the first authentication packet and a number of a port receiving the first authentication packet. The access device 12 encapsulates the first authentication packet (for example, the EAPoL-Start packet) of the terminal 11 using a control plane protocol, and sends a packet obtained after encapsulation to the network device 13. After decapsulating the packet sent through the authentication channel to obtain the first authentication packet, the network device 13 performs an authentication procedure of the terminal 11. In a process of performing the authentication procedure, the network device 13 decapsulates a packet sent by the access device 12, and processes, as specified in a standard, a packet (for example, the EAPoL-Start packet, an EAP Response packet, or an EAP Challenge Response packet) obtained after decapsulation. In addition, the network device 13 encapsulates, using the control plane protocol, a packet (for example, an EAP Request) to be sent to the terminal 11, and sends a packet obtained after encapsulation to the access device 12. The network device 13 further receives a packet (for example, a RADIUS Access-Challenge packet or a RADIUS Access-Accept) sent by the authentication server, processes the packet according to the authentication procedure, encapsulates a packet that is obtained after processing and that needs to be sent to the terminal device, and then sends a packet (for example, an EAP Challenge Request or EAP Success packet) obtained after encapsulation to the access device 12 through the authentication channel.

The access device 12 receives, through the authentication channel, an authentication packet (for example, an EAP Request packet or an EAP Challenge Request or EAP Success packet in FIG. 3C) sent by the network device 13, decapsulates the packet sent through the authentication channel, and sends a packet obtained after decapsulation to the terminal 11.

After receiving a second authentication packet (for example, a RADIUS Access-Accept packet) sent by the authentication server, the network device 13 not only sends, to the access device 12 through the authentication channel, an EAP Success packet that is encapsulated into the RADIUS Access-Accept packet, but also obtains other authorization information, for example, information such as the VLAN ID and the group identifier, from the RADIUS Access-Accept packet sent by the authentication server. The recorded port receiving the first authentication packet is added to the VLAN identified by the authorization information VLAN ID. After receiving the EAP Success packet, the access device 12 sets the port connected to the terminal 11 to the controlled state.

Optionally, referring to FIG. 3C, the network device 13 further encapsulates the MAC address of the terminal 11 and the VLAN ID in the authorization information using the control plane protocol, and then sends a packet obtained after encapsulation to the access device. The access device 12 decapsulates the received packet to obtain the MAC address of the terminal 11 and the VLAN ID of the terminal 11, obtains the created entry by querying the user information table (or the forwarding table) based on the MAC address of the terminal 11, and adds the VLAN ID of the terminal 11 to the entry. A correspondence between the port and the VLAN ID is established using the entry. In other words, a value of a default VLAN of the port connected to the terminal 11 is set to the VLAN ID. The control plane protocol herein may be a newly defined protocol, or may be implemented by making some extension to an existing protocol, for example, implemented by extending LISP. An example of an extension manner is given in the following embodiments.

In this embodiment of this application, after the terminal 11 is authenticated, the terminal 11 can communicate with another terminal within an authorized range. For example, when the terminal 11 initiates access to another terminal, the terminal 11 generates an Ethernet frame. A source address of the Ethernet frame is the MAC address of the terminal 11. After receiving the Ethernet frame sent by the terminal 11, the access device 12 adds the VLAN ID of the default VLAN to a VLAN tag field in the Ethernet frame based on the default VLAN of the port receiving the Ethernet frame. Then the access device 12 sends, to the network device 13, the Ethernet frame with an Ethernet header including the added VLAN ID to which the VLAN ID is added.

In the manner 2, the network device performs the authentication procedure of the terminal device, and the access device and the network device transmit authentication packets to each other using LISP. An authenticator is the network device farther from the terminal such that a large quantity of access devices closer to the terminal do not need to support a VXLAN, and even may not need to support authentication. Therefore, simpler and lower-cost hardware can be used for implementation, thereby reducing deployment costs.

Figure 5:
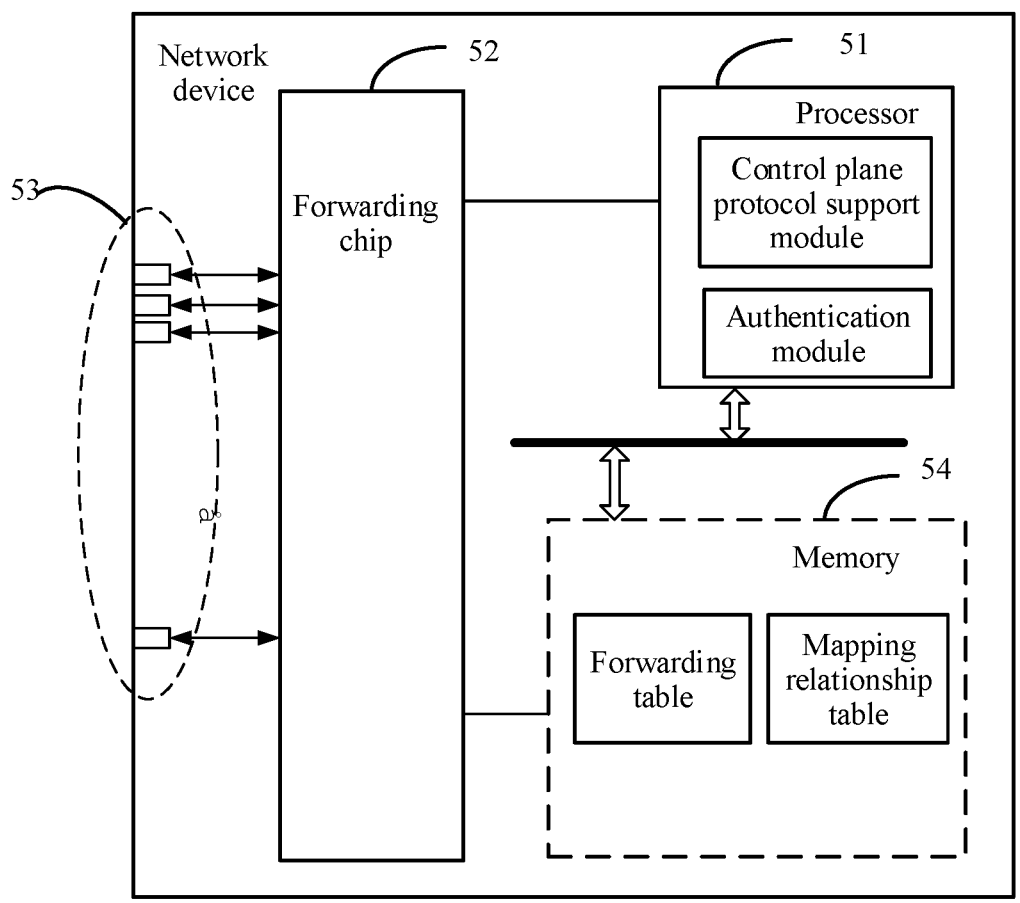
FIG. 5 is a schematic structural diagram of a network device according to an embodiment of this application.

FIG. 5 is a schematic structural diagram of a network device in the scenario shown in FIG. 1. The network device shown in FIG. 5 serves as the network device in the procedure shown in FIG. 2, to implement the function of the network device in FIG. 2. The network device in FIG. 5 includes a processor 51, a forwarding chip 52, ports 53, and a memory 54. The ports 53 include a plurality of ports. The forwarding chip 52 is connected to each of the ports 53.

The forwarding chip 52 and the memory 54 may be integrated with the processor 51 into a same physical component, or may be separate physical components. When the forwarding chip 52 and the memory 54 are integrated with the processor 51 into a same physical component (for example, a multi-core CPU), the memory 54 is in the CPU, and the forwarding chip 52 may be a core in the multi-core CPU. When the forwarding chip 52 and the memory 54 are separate physical components independent of the processor 51, both the forwarding chip 52 and the memory 54 are connected to the processor 51. The forwarding chip 52 is further connected to the memory 54.

When the memory 54 is a separate physical component, the memory 54 includes but is not limited to a random access memory (RAM), a read-only memory (ROM), an erasable programmable read-only memory (EPROM), a ternary content addressable memory (TCAM), a flash memory, an optical memory, or the like.

The memory 54 is configured to store the mapping relationship table shown in Table 1 between a VLAN ID and a VNI and a forwarding table. The mapping relationship table is used to store a mapping from a VLAN ID to a VNI, and the mapping may be configured by a manager.

An entry in the forwarding table stores a mapping relationship between a MAC address of a terminal and a port number. The port number indicates a port on the network device. Optionally, each entry in the forwarding table further stores at least one VLAN ID used to indicate a VLAN to which a port is added. Table 2 is an example of an entry in the forwarding table of the network device 13 in FIG. 1. "00e0-d26b-8121" is the MAC address of the terminal 11, "E1/0/0" indicates a port on the network device 13, and the port is added to the VLAN indicated by the VLAN 10. Certainly, during actual storage, network devices from different vendors may store the mapping relationship between a MAC address and a port number using different data structures.

TABLE 2

| Number | MAC address | Port number | VLAN ID |
|--------|-------------|-------------|---------|
| 1 | 00e0-d26b-8121 | E1/0/0 | VLAN 10 |
| 2 | ... | ... | ... |

The forwarding chip 52 may access information in the memory 54.

A specific connection medium between the foregoing components is not limited in this embodiment of this application, and is, for example, a bus.

The processor 51 is configured to control the forwarding chip 52 to configure a VXLAN tunnel between the network device and another network device.

The port 53 is configured to connect to an access device, or connect to the another network device.

A first port in the ports 53 is connected to the access device, and the first port is configured to receive an Ethernet frame forwarded by the access device. A VLAN tag field in the Ethernet frame includes the VLAN ID.

The processor 51 is further configured to obtain, based on the VLAN ID included in the VLAN tag field in the Ethernet frame and the mapping shown in Table 1 from a VLAN ID to a VNI, the VNI to which the VLAN ID included in the VLAN tag field in the Ethernet frame is mapped, and add a VXLAN header to the Ethernet frame to obtain a VXLAN packet. The VXLAN header includes the VNI.

A second port in the ports 53 is configured to send the VXLAN packet obtained by the processor 51. Optionally, the second port sends the VXLAN packet to the another network device through the VXLAN tunnel. For example, a structure of the network device 13 in FIG. 1 is shown in FIG. 5, and the network device 13 sends the VXLAN packet to the network device 23.

If the network device shown in FIG. 5 obtains a VLAN ID of a terminal device in the manner 1 shown in FIG. 3B, the first port is configured to receive an adding instruction from the access device. The adding instruction includes the VLAN ID. The VLAN ID is sent by the access device serving as an authenticator device to the network device after the terminal device is authenticated and the access device obtains authorization information of the terminal device. Optionally, the access device encapsulates the VLAN ID into a control plane protocol packet, to obtain the adding instruction.

The processor 51 is configured to obtain the VLAN ID from the adding instruction, and add the first port to a VLAN identified by the VLAN ID. Optionally, the processor decapsulates the control plane protocol packet to obtain the VLAN ID from the control plane protocol packet, and adds the first port to the VLAN identified by the VLAN ID.

Optionally, a control plane protocol is LISP. In other words, the adding instruction is an LISP packet. Herein, to distinguish the LISP packet serving as the adding instruction from a subsequent LISP packet with another purpose, the LISP packet serving as the adding instruction is referred to as a "first LISP packet". Optionally, the processor 51 implements the foregoing functions using different function modules. For example, the processor 51 includes an LISP support module, configured to decapsulate the first LISP packet based on a predetermined LISP extension format, to obtain the VLAN ID.

If the network device shown in FIG. 5 obtains a VLAN ID of a terminal device in the manner 2 shown in FIG. 3C, in other words, the network device serves as an authenticator device, the processor 51 is further configured to establish an authentication channel between the network device and the access device. The ports 53 include the plurality of ports, the first port is connected to the access device, and the first port is configured to receive a first authentication packet from the access device. The first authentication packet is used in authentication for a supplicant device.

The processor 51 is configured to record a correspondence between the first port and a supplicant device address in the first authentication packet.

A third port in the ports 53 is configured to receive a second authentication packet from an authentication server. The second authentication packet includes the supplicant device address and the VLAN ID.

The processor 51 is further configured to add the first port to a VLAN identified by the VLAN ID, based on the supplicant device address and the VLAN ID in the second authentication packet and the recorded correspondence between the first port and the supplicant device address.

Optionally, in an authentication process, an authentication packet transmitted between the network device and the access device is encapsulated using a control plane protocol. Optionally, the control plane protocol is LISP. The first port is further configured to receive a second LISP packet from the access device. The first authentication packet is encapsulated into the second LISP packet.

For example, with reference to FIG. 3C, the first authentication packet is an EAPoL-Start packet, and the second authentication packet is a RADIUS Access-Accept packet. The RADIUS Access-Accept packet includes the supplicant device address and authorization information, and the authorization information includes the VLAN ID.

Optionally, the processor 51 is further configured to, after obtaining the VLAN ID from the second authentication packet, send a binding instruction to the access device through the first port. The binding instruction includes the supplicant device address and the VLAN ID. Optionally, the network device encapsulates the supplicant device address and the VLAN ID using a control plane protocol, and then sends a control plane packet obtained through encapsulation to the access device. Optionally, the control plane protocol is LISP.

Optionally, the processor 51 implements the foregoing functions using different function modules. For example, the processor 51 includes an LISP support module and an authentication module. The LISP support module is configured to decapsulate, according to LISP, an authentication packet (for example, an EAPoL-Start packet, an EAP Response, or an EAP Challenge Response) that is sent by the access device through the authentication channel, encapsulate, using LISP, an authentication packet (for example, an EAP Request or an EAP Challenge Request) to be sent to the terminal device and then send a packet obtained through encapsulation to the access device through the authentication channel, and encapsulate the VLAN ID using a predetermined LISP extension format and then send a packet obtained through encapsulation to the access device through the authentication channel. The authentication module is configured to support authentication packet parsing, and perform corresponding processing according to an authentication procedure. For example, referring to FIG. 3C, after the port 53 obtains an EAPoL-Start packet that is sent by the terminal device and that is obtained after decapsulation, the authentication module generates an EAP Request packet, the LISP support module encapsulates the EAP Request packet using the LISP extension format, and then sends the encapsulated EAP Request packet through the authentication channel. For another example, after obtaining an EAP Response packet through decapsulation, the authentication module sends a RADIUS Access-Request packet to the authentication server. Refer to FIG. 3C and a related text description. Details are not described herein again.

Optionally, the LISP support module and/or the authentication module in the processor 51 may be implemented using software, or may be implemented using a core in the multi-core CPU.

The network device shown in FIG. 5 is applied to the scenario shown in FIG. 1, to implement the function of the network device in the procedure shown in FIG. 2. For another additional function implemented by each component in FIG. 5 and a process of interaction between each component and another network element device (for example, the access device or the authentication server), refer to the description of the network device in the method embodiment shown in FIG. 2, FIG. 7A and FIG. 7B, or FIG. 11A and FIG. 11B. Details are not described herein again.

Figure 6:
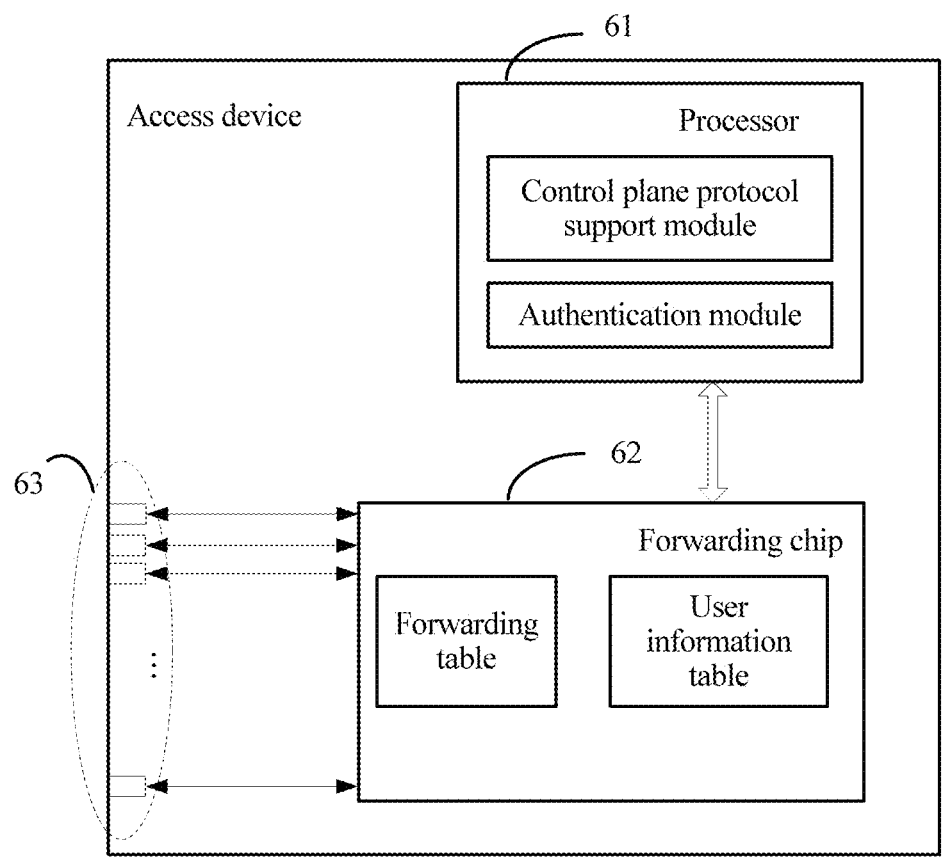
FIG. 6 is a schematic structural diagram of an access device according to an embodiment of this application.

FIG. 6 is a schematic structural diagram of an access device in the scenario shown in FIG. 1. The access device shown in FIG. 6 serves as the access device that is in FIG. 2 and that is connected to a network device, to implement the function of the access device in the procedure shown in FIG. 2. The access device in FIG. 6 includes a processor 61, a forwarding chip 62, ports 63, and a memory 64. The ports 63 include a plurality of ports. The forwarding chip 62 is connected to each port.

The forwarding chip 62 and the memory 64 may be integrated with the processor 61 into a same physical component, or may be separate physical components. When the forwarding chip 62 and the memory 64 are integrated with the processor 61 into a same physical component (for example, a multi-core CPU), the memory 64 is in the CPU, and the forwarding chip 62 may be a core in the multi-core CPU. When the forwarding chip 62 and the memory 64 are separate physical components independent of the processor 61, both the forwarding chip 62 and the memory 64 are connected to the processor 61. The forwarding chip 62 is further connected to the memory 64.

When the memory 64 is a separate physical component, the memory 64 includes but is not limited to a random-access memory (RAM), a read-only memory (ROM), an erasable programmable read-only memory (EPROM), a ternary content-addressable memory (TCAM), a flash memory, an optical memory, or the like.

The memory 64 is configured to store a forwarding table and a user information table.

The forwarding chip 62 may access the forwarding table and the user information table in the memory 64.

A specific connection medium between the foregoing components is not limited in this embodiment of this application, and is, for example, a bus.

The forwarding table on the access device is similar to Table 2, and is not repeatedly described herein. Each entry in the user information table stores an address (a MAC address or an IP address) of a terminal device, a user name of a user accessing a network using the terminal device, a number of a port on the access device, and authorization information of the terminal device. The authorization information includes a VLAN ID. Table 3 is an example of an entry in the user information table of the access device 12 in FIG. 1. A user name is S1, "00e0-d26b-8121" is the MAC address of the terminal 11, "VLAN 10" is the authorization information of the terminal 11, S1 is a user name of a user accessing a network using the terminal 11, and the terminal 11 is connected to the port E1/0/0 of the access device 12.

TABLE 3

| Number | User name | MAC address | Port number | Authorization information |
|---|---|---|---|---|
| 1 | S1 | 00e0-d26b-8121 | E1/0/0 | VLAN 10 |
| | | ... | | ... |

The port 63 is configured to connect to the terminal device, and connect to the network device.

The processor 61 is further configured to, when an authentication packet sent by the terminal device after the terminal device gets online is received, create a new entry in the user information table, and write, to the newly created entry, an address of the terminal device and a number of a port receiving the authentication packet. After the terminal device is authenticated, the processor 61 obtains the address of the terminal device and authorization information of the terminal device, finds the corresponding entry in Table 3 based on the address of the terminal device, and stores a VLAN ID in the authorization information into the entry. Storing the VLAN ID in the authorization information into Table 3 is equivalent to establishing a correspondence between the port number and the authorized VLAN ID, in other words, setting a value of a first default VLAN of the port identified by the port number to the authorized VLAN ID.

In an embodiment, if the network device connected to the access device shown in FIG. 6 obtains a VLAN ID using the method described in the manner 1 shown in FIG. 3B, the access device is an authenticator device. In the manner 1, the processor 61 of the access device is configured to obtain a VLAN ID allocated by an authentication server to an authenticated supplicant device. A first port in the ports 63 is connected to the network device, and the first port is configured to send an LISP packet to a VXLAN tunnel end point VTEP device (namely, the network device). The LISP packet includes the VLAN ID. The LISP packet is the foregoing adding instruction. To distinguish the LISP packet from an LISP packet with another purpose, the LISP packet further includes a packet type indicator. The packet type indicator is used to instruct the VTEP device to add a port receiving the LISP packet to a VLAN identified by the VLAN ID.

After the terminal device is authenticated, the processor 61 obtains, from the authorization information, the VLAN ID allocated by the authentication server to the terminal device, and controls the first port to send a first LISP packet to the network device connected to the access device. The first LISP packet includes the authorized VLAN ID of the terminal device. For example, referring to FIG. 3B, after the first port receives a RADIUS Access-Accept packet sent by the authentication server, the processor 61 obtains other authorization information of the terminal device, for example, information such as the VLAN ID and a group identifier, from the RADIUS Access-Accept packet, and controls the first port to send the VLAN ID to the network device using LISP. Optionally, the processor 61 implements the foregoing functions using different function modules. For example, the processor 61 includes an authentication module and an LISP support module. The authentication module is configured to complete an authentication process of the terminal device according to an authentication procedure. For details, refer to FIG. 3B and a related description. The LISP support module is configured to encapsulate the VLAN ID in the authorization information based on an LISP extension format, and send the encapsulated VLAN ID to the network device.

Optionally, the processor 61 is further configured to determine a second port connected to the supplicant device, and set a value of a default VLAN of the second port to the VLAN ID after obtaining the VLAN ID allocated by the authentication server to the authenticated supplicant device. The second port is further configured to receive an Ethernet frame from the supplicant device. A source address of the Ethernet frame is a MAC address of the supplicant device. The processor 61 adds a VLAN tag including the VLAN ID to the Ethernet frame based on the default VLAN of the second port, and then forwards the Ethernet frame.

In an embodiment, if the network device connected to the access device shown in FIG. 6 obtains a VLAN ID using the method described in the manner 2 shown in FIG. 3C, the network device is an authenticator device. A first port in the ports 63 is connected to the terminal device, and the first port is configured to receive an authentication packet from the terminal device. The terminal device is a supplicant device. The processor 61 is configured to record a correspondence between the first port and a MAC address of the supplicant device that is in the authentication packet. A second port in the ports 63 is connected to the network device, and the second port is configured to send the authentication packet to the network device. The network device is an authenticator device and a VXLAN tunnel end point VTEP device. The second port is further configured to receive a binding instruction from the network device. The binding instruction includes an address (an IP address or the MAC address) of the supplicant device and the VLAN ID. The processor 61 is further configured to set a value of a default VLAN of the first port to the VLAN ID based on the correspondence and the address, in the binding instruction, of the supplicant device.

Optionally, the authentication packet and the binding instruction are encapsulated using a control plane protocol. Optionally, the control plane protocol is LISP. In this case, the second port sends a first LISP packet to the network device. The authentication packet from the terminal device is encapsulated into the first LISP packet, and the terminal device accesses a network using the access device. The second port, the port connected to the network device, is further configured to receive a second LISP packet from the network device. The binding instruction, namely, the MAC address of the supplicant device and the VLAN ID, is encapsulated into the second LISP packet.

Optionally, the processor 61 implements the foregoing functions using different function modules. For example, the processor 61 includes an LISP support module and an authentication module. The LISP support module is configured to encapsulate the authentication packet from the terminal device based on the LISP extension format, and send the encapsulated authentication packet (for example, an EAPoL-Start packet, an EAP Response, or an EAP Challenge Response) to the network device through an authentication channel, and decapsulate a received LISP packet sent by the network device to obtain an authentication packet (for example, an EAP Request or an EAP Challenge Request) from the LISP packet, and then send the authentication packet to the terminal device. The LISP support module is further configured to, after the second port receives the VLAN ID that is encapsulated by the network device using the LISP extension format, perform decapsulation to obtain the VLAN ID. The authentication module is configured to store, into the user information table, the authorization information obtained after decapsulation.

Optionally, the LISP support function module and the authentication module in the processor 61 may be implemented using software, or may be implemented using a core in the multi-core CPU.

Optionally, the first port is further configured to receive an Ethernet frame from the terminal device. A source address of the Ethernet frame is the MAC address of the supplicant device. The processor 61 is further configured to add a VLAN tag including the VLAN ID to the Ethernet frame based on the default VLAN of the first port, and then forward the Ethernet frame.

The access device shown in FIG. 6 is applied to the scenario shown in FIG. 1, to implement the function of the access device in the procedure shown in FIG. 2. For another additional function implemented by each component in FIG. 6 and a process of interaction between each component and another network element device (for example, the network device, the terminal device, or the authentication server), refer to a description of the access device in the method embodiment shown in FIG. 2, FIG. 7A and FIG. 7B, or FIG. 11A and FIG. 11B. Details are not described herein again.

Figure 7A:
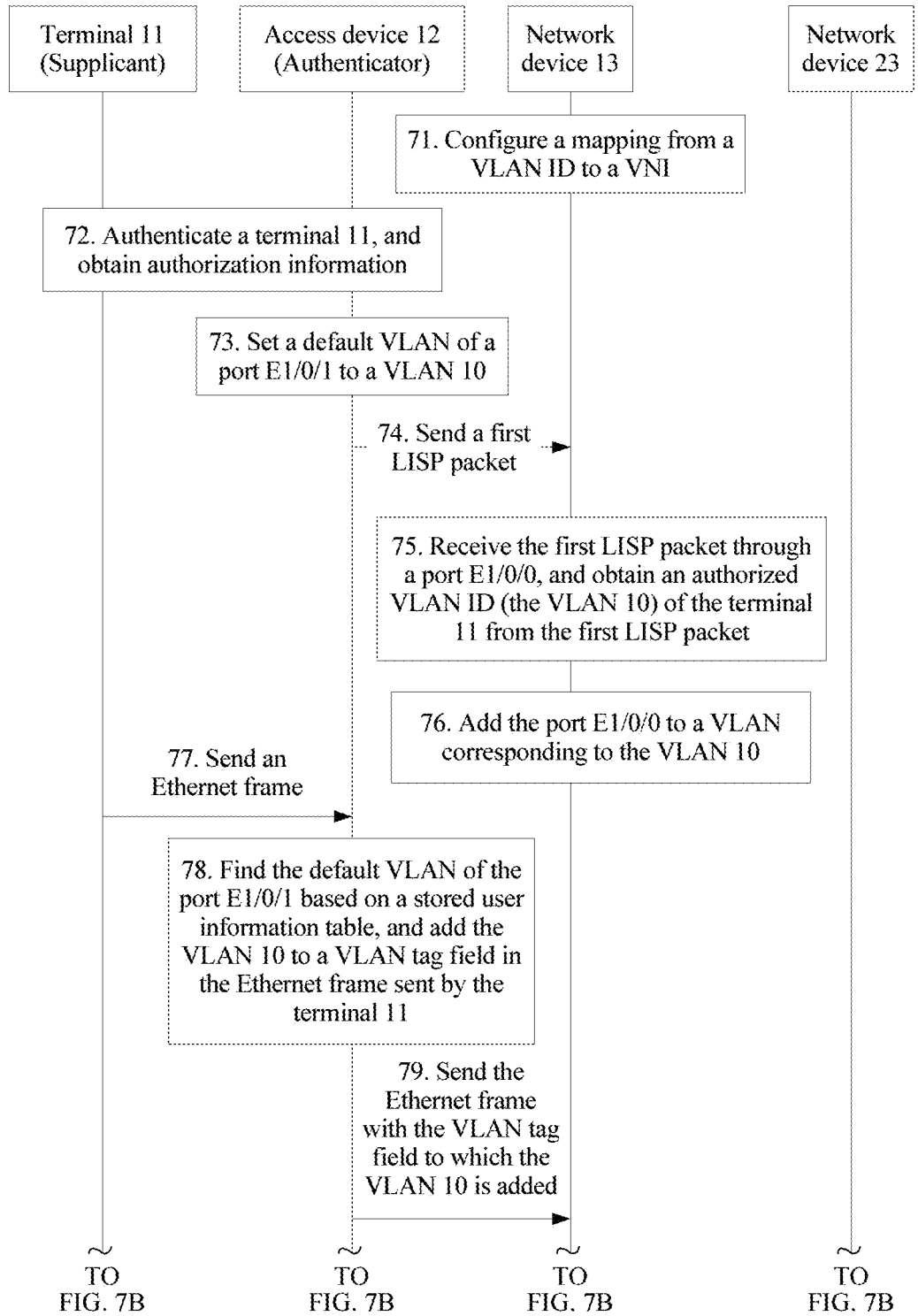
FIG. 7A and FIG. 7B are schematic diagrams of a VXLAN implementation method according to an embodiment of this application.
Figure 7B:
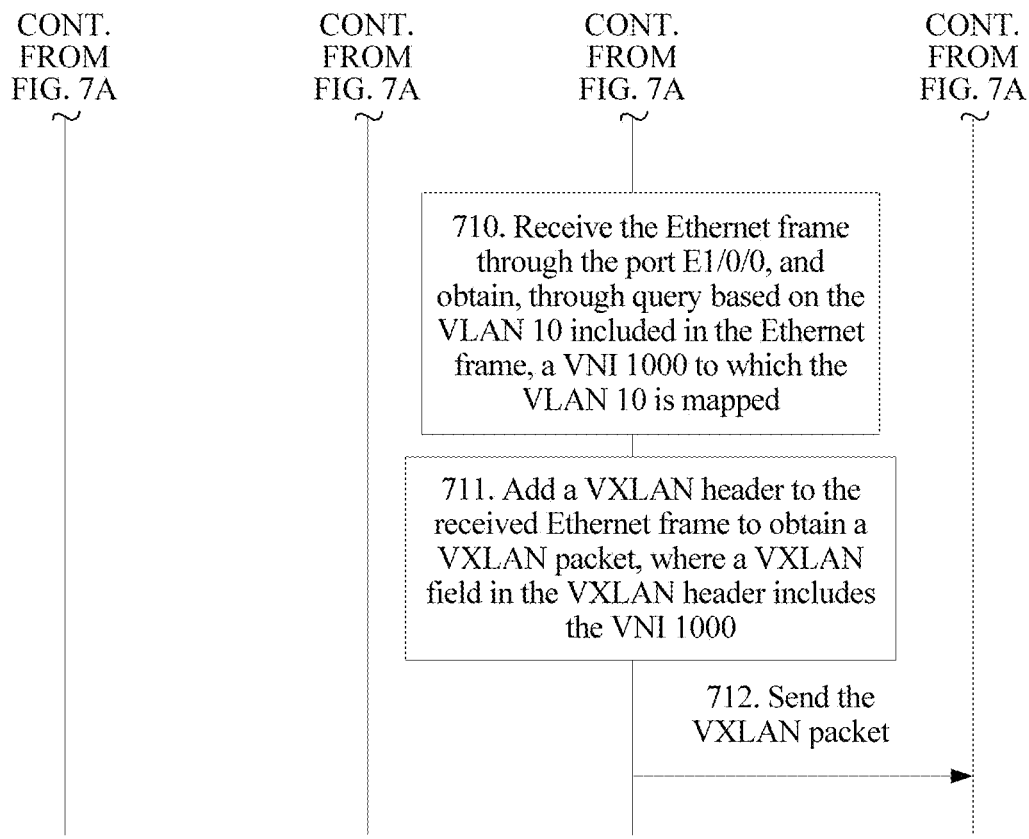

FIG. 7A and FIG. 7B are schematic diagrams of a VXLAN implementation method according to an embodiment of this application. In the method shown in FIG. 7A and FIG. 7B, an authenticator device is an access device. After authenticating a terminal device and obtaining authorization information that is set by an authentication server for the terminal device, the access device sends an authorized VLAN ID of the terminal device to a network device using an extended LISP packet such that the network device obtains the authorized VLAN ID of the terminal. The network device adds a port connected to the access device to a VLAN identified by the VLAN ID. Subsequently, after receiving an Ethernet frame from the access device, the network device searches a mapping from a VLAN ID to a VNI for a corresponding VNI based on a VLAN ID in the Ethernet frame, and adds a VXLAN header to the Ethernet frame to obtain a VXLAN packet. A VNI field in the VXLAN header includes the VNI. An application scenario of FIG. 7A and FIG. 7B is shown in FIG. 1, and an authentication process is shown in FIG. 3B.

The method shown in FIG. 7A and FIG. 7B includes the following step 71 to step 717.

Step 71: A manager configures a mapping from a VLAN ID to a VNI on the network device 13. Similarly, the manager may also configure a mapping from a VLAN ID to a VNI on the network device 23. Optionally, on the network device 13 and the network device 23, VLAN IDs mapped to a same VNI may be the same or may be different.

Step 72: The terminal 11 gets online using an access device 12, and triggers an authentication procedure of the terminal 11. After the terminal 11 is authenticated, the authentication server 50 sends authorization information of the terminal 11 to the access device 12. The authorization information includes a VLAN identifier "VLAN 10" of the terminal 11. Optionally, the authorization information further includes a group identifier "Group 1" of the terminal 11. The group identifier of the terminal 11 is used to control access of the terminal 11. A specific authentication process is shown in FIG. 3B, and is not repeated herein.

Step 73: The access device 12 connects to the terminal 11 through a port E1/0/1, and the access device 12 sets a default VLAN of the port E1/0/1 to a VLAN 10.

Step 74: The access device 12 sends a first LISP packet to the network device 13. The first LISP packet includes the authorized VLAN ID of the terminal 11, namely, the VLAN 10.

In this embodiment of this application, the network device 13 is connected to the access device 12 through a port indicated by a port number E1/0/0.

To carry the VLAN 10 using an LISP packet, an existing LISP packet needs to be extended. For ease of understanding, a field structure of the LISP protocol is first shown in FIG. 8, and then an LISP protocol extension manner is described with reference to FIG. 9. For descriptions of fields in FIG. 8, refer to an existing standard document, for example, RFC 6830. Details are not described herein.

Figure 8:
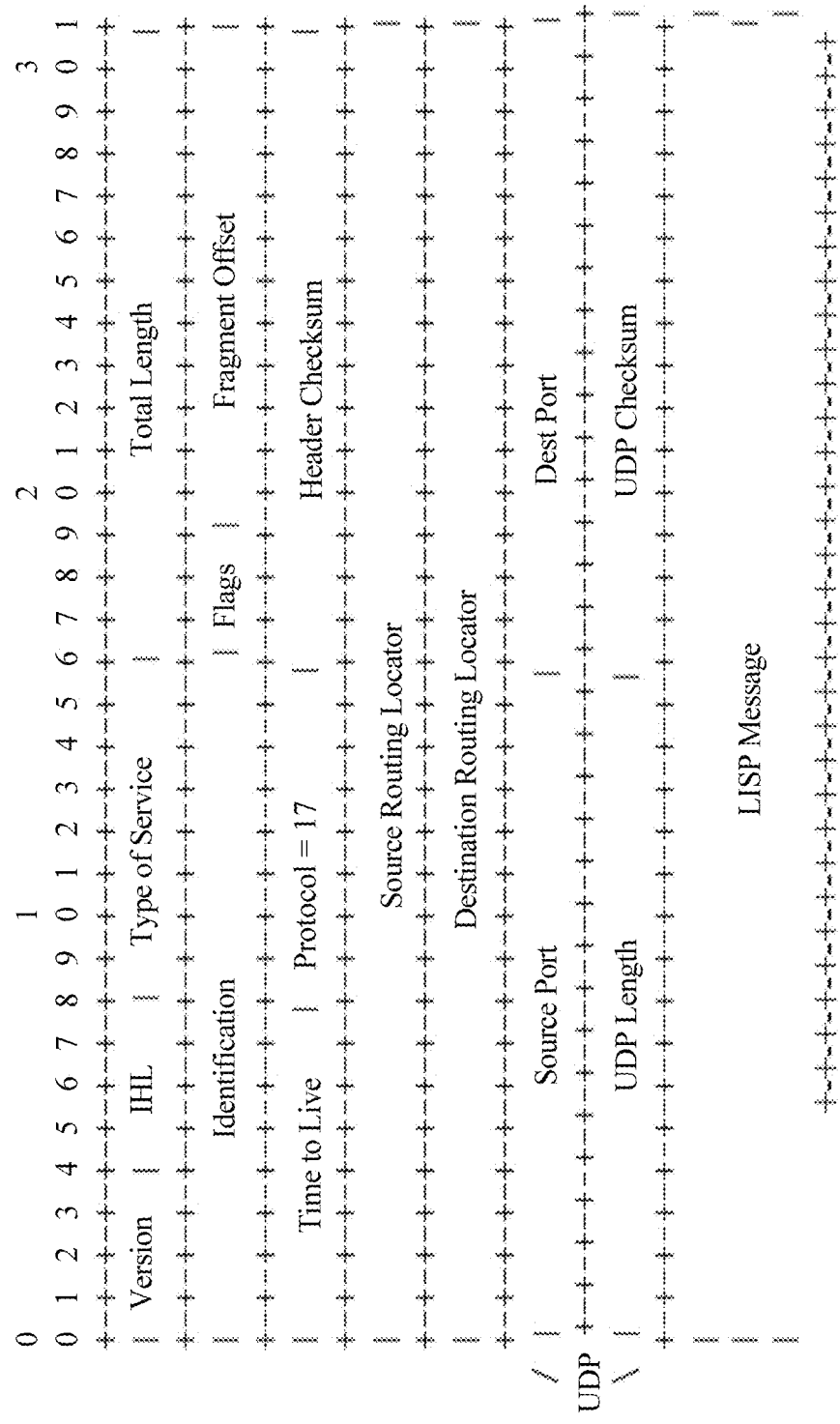
FIG. 8 is a schematic diagram of a field structure of an LISP packet according to an embodiment of this application.

In this embodiment of this application, for the first LISP packet sent by the access device 12 to the network device 13, a "Source Routing Locator" in FIG. 8 is an LISP address of the access device 12, a "Destination Routing Locator" is an LISP address of the network device 13, content written to a "Source Port" is statically configured or dynamically generated by the sender of the LISP packet, and a "Dest Port" is 4342. Likewise, for an LISP packet sent by the network device 13 to the access device 12, a "Source Routing Locator" is the LISP address of the network device 13, a "Destination Routing Locator" is the LISP address of the access device 12, a value of a "Dest Port" is a value of the "Source Port" in the LISP packet sent by the access device 12 to the network device 13, and a "Source Port" is 4342.

Figure 9:
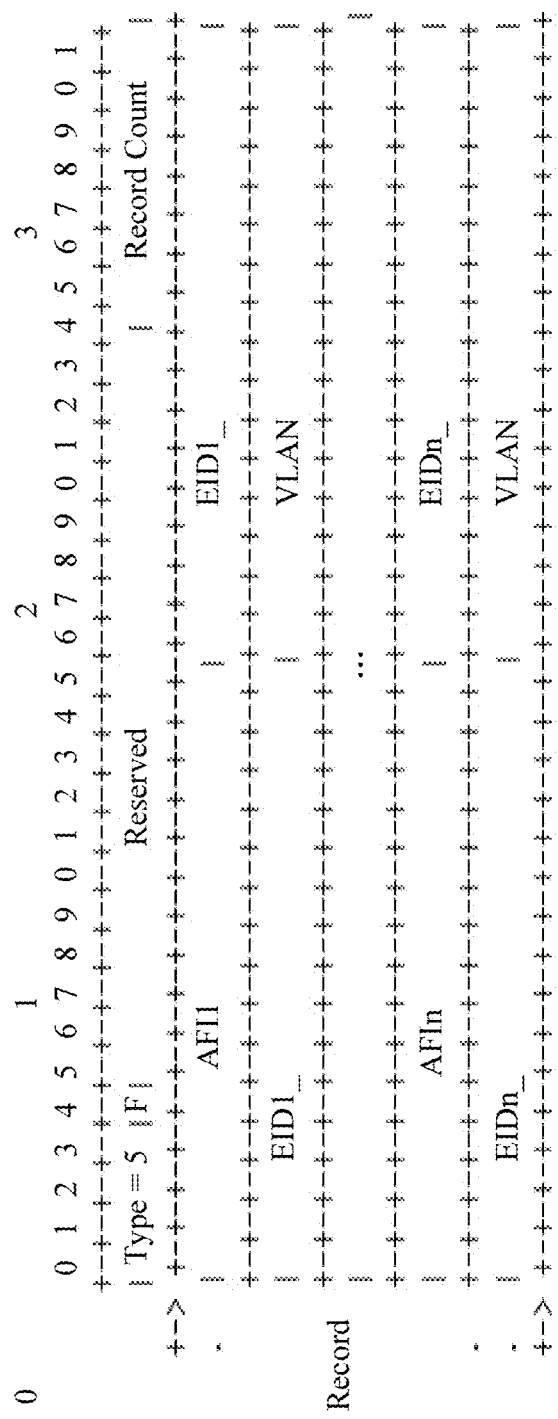
FIG. 9 is a schematic diagram of a first LISP packet extension manner according to an embodiment of this application.

The first LISP packet in this embodiment is implemented by mainly extending and defining a "LISP Message" part in FIG. 8. Details are shown in FIG. 9.

In this embodiment, the "LISP Message" part carries at least the VLAN 10.

Optionally, when the access device and the network device transmit various types of different information to each other using LISP, a corresponding packet type indicator may be allocated to each type of information such that a receiver can identify information carried in an LISP packet. As shown in FIG. 9, a "LISP Message" part in an extended LISP packet includes a packet type indicator used to indicate that this LISP packet includes a VLAN ID. Optionally, the packet type indicator is represented by an integer, and stored in a Type field. In this embodiment, an integer "5" is used to indicate that this LISP packet includes a VLAN ID. Actually, a value of the packet type indicator and a location of the packet type indicator in the "LISP Message" part may be flexibly set, provided that both the access device and the network device can identify the packet type indicator based on a predefined format, to determine a purpose of the LISP packet. With a first packet type indicator, the network device can identify the LISP packet used for encapsulating the authorized VLAN ID of the terminal, to obtain the authorized VLAN ID of the terminal from the LISP packet.

Optionally, for ease of parsing, a Record field in the "LISP Message" part may be used to record a VLAN ID.

Optionally, after getting online, the terminal 11 may be disconnected from a network for various reasons, for example, a charging excess, and does not access the network using the access device 12 for a relatively long time. In this case, the access device 12 may set the default VLAN of the port number E1/0/1 to another VLAN ID. To save storage space of the network device 13, the access device 12 needs to properly instruct the network device 13 to delete the port from a VLAN. For this requirement, in this embodiment of this application, an operation indicator may be further carried in the "LISP Message" part. The operation indicator is used to instruct the receiver of the extended LISP packet to add a port to a VLAN, or may instruct the receiver of the extended LISP packet to delete a port from a VLAN.

In this embodiment, after the terminal 11 is authenticated, a "LISP Message" part in the first LISP packet sent by the access device 12 to the network device 13 carries a first operation indicator, and the first operation indicator is used to instruct the receiver to add the port to the VLAN. After the first LISP packet is sent, a second LISP packet may be further sent. The second LISP packet is in a format similar to that of the first LISP packet. A difference is that, a "LISP Message" part in the second LISP packet carries a second operation indicator, and the second operation indicator is used to instruct the receiver to delete the port from the VLAN. Optionally, the operation indicator is carried in an F field shown in FIG. 9. For example, the operation indicator is an integer, 0 instructs to add a port to a VLAN, and 1 instructs to delete a port from a VLAN.

Optionally, when the access device 12 is connected to a relatively large quantity of terminal devices, a plurality of terminal devices connected to the access device 12 may all get online and authenticated within a short time. To improve efficiency of communication between the access device 12 and the network device 13, authorized VLAN IDs of the plurality of terminal devices may be carried in a same LISP packet. In this case, a Record Count field may be added to the "LISP Message" part in the first LISP packet, and a value of the field is used to indicate a quantity of Record fields carried in the LISP packet, as shown in FIG. 9.

Optionally, the access device 12 may further add other information to the first LISP packet. For example, the Record field carries an address type and an address of the terminal 11. For example, types of terminal device addresses include at least an IPv4 address, an IPv6 address, and a MAC address. For example, a number 1 is used to represent the IPv4 address, a number 2 is used to represent the IPv6 address, and a number 16389 is used to represent the MAC address. In this embodiment, an address type indicator is carried in an AFI sub-field of the Record field. The access device 12 adds the address of the terminal 11 to an EID sub-field of the Record field.

Step 75: The network device 13 receives the first LISP packet through a port E1/0/0, and obtains an authorized VLAN ID of the terminal 11, namely, the VLAN 10, from the first LISP packet.

Step 76: The network device 13 adds the port E1/0/0 to a VLAN corresponding to the VLAN 10.

Step 77: The terminal 11 accesses the terminal 21, and the access device 12 receives, through the port E1/0/1, an Ethernet frame sent by the terminal 11.

Step 78: The access device 12 finds, based on a stored user information table, that the default VLAN of the port E1/0/1 is the VLAN 10, and adds the VLAN 10 to a VLAN tag field in the Ethernet frame sent by the terminal 11.

Step 79: The access device 12 sends, to the network device 13, the Ethernet frame with the VLAN tag field to which the VLAN 10 is added.

Step 710: The network device 13 receives the Ethernet frame through the port E1/0/0, and obtains, by querying a stored mapping relationship table (shown in Table 1) based on the VLAN 10 included in the Ethernet frame, a VNI 1000 to which the VLAN 10 is mapped.

Figure 10:
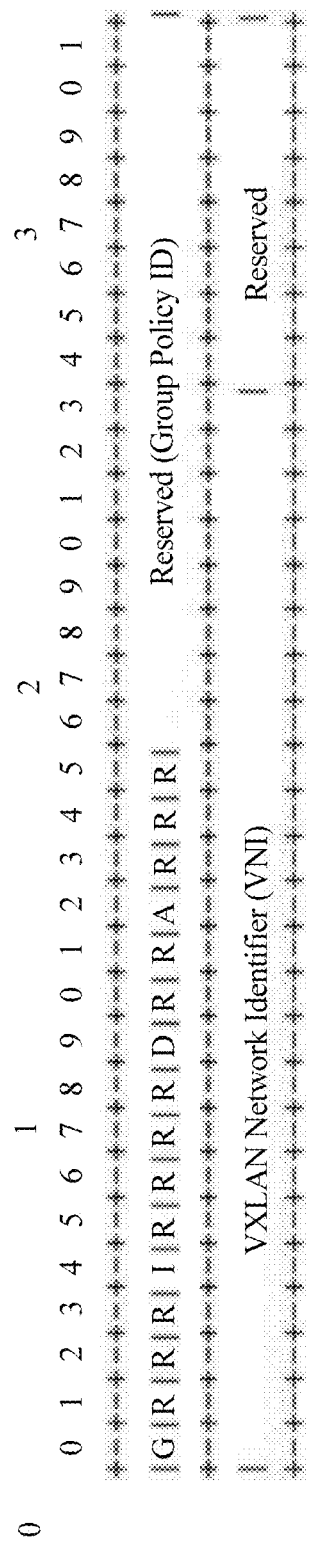
FIG. 10 is a schematic diagram of a VXLAN packet header according to an embodiment of this application.

Step 711: The network device 13 adds a VXLAN header to the received Ethernet frame to obtain a VXLAN packet, where a VNI field in the VXLAN header includes the VNI 1000. A structure of the VXLAN header is shown in FIG. 10.

Step 712: The network device 13 sends the VXLAN packet to the network device 23.

A process of processing, by the network device 23, a packet sent by the terminal 21 is similar to that of the network device 13, and is not repeatedly described herein.

Figure 11A:
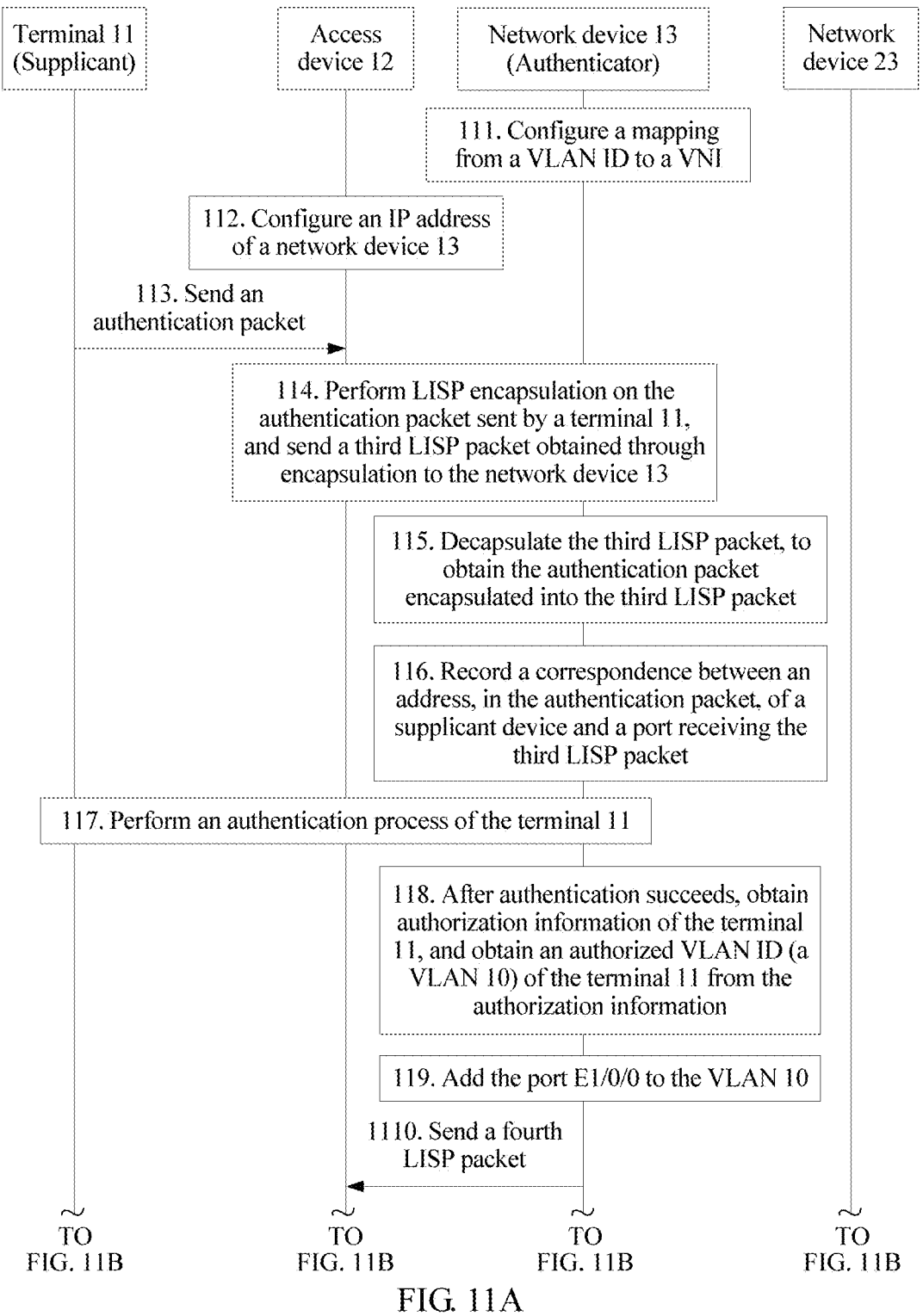
FIG. 11A and FIG. 11B are schematic diagrams of a VXLAN implementation method according to an embodiment of this application.
Figure 11B:
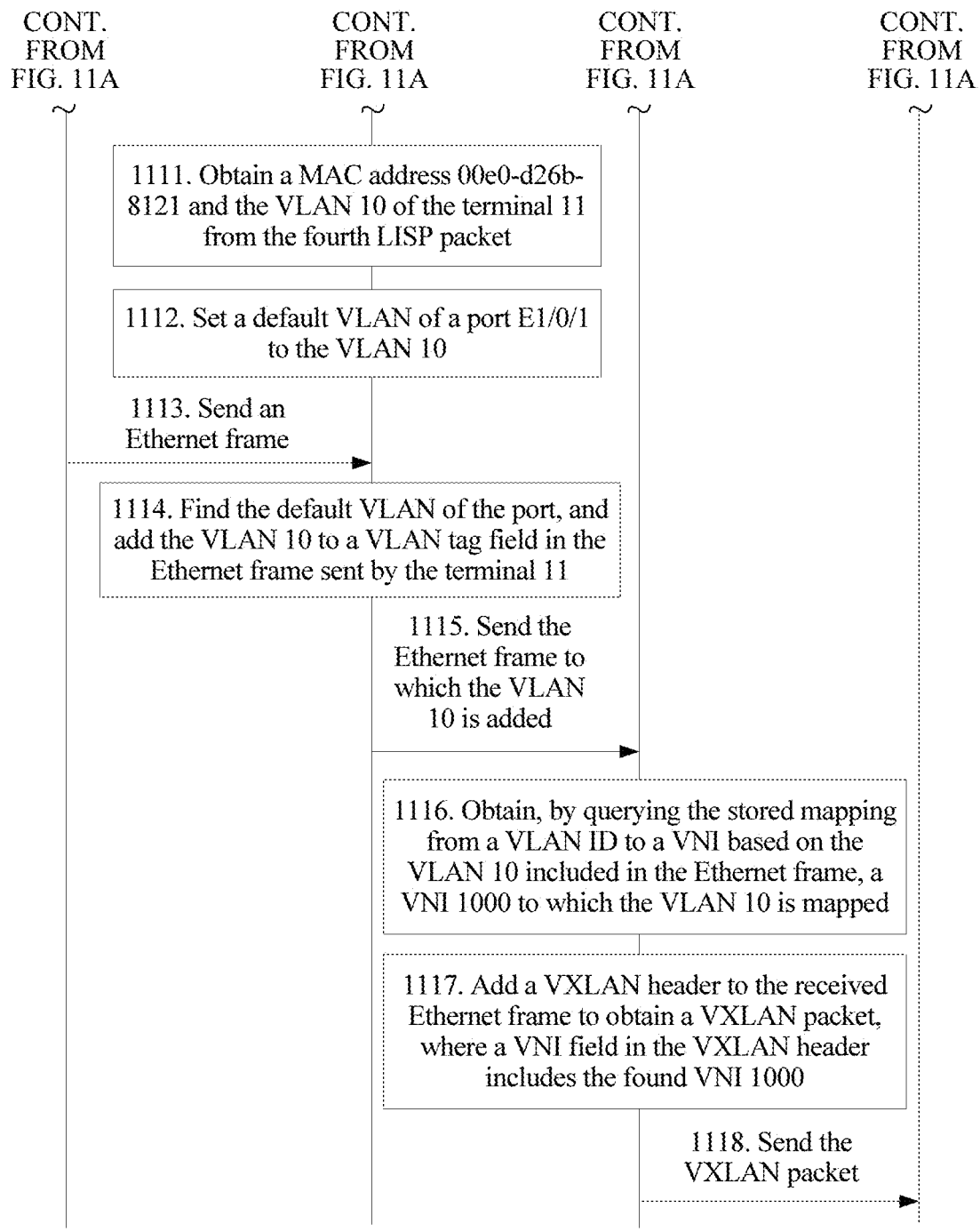

FIG. 11A and FIG. 11B are schematic diagrams of another VXLAN implementation method according to an embodiment of this application. In the method shown in FIG. 11A and FIG. 11B, an authenticator device is a network device. An authentication channel is established between an access device and the network device to transmit an authentication packet. Subsequently, after receiving an Ethernet frame from the access device, the network device adds a VXLAN header to the Ethernet frame based on a mapping from a VLAN ID to a VNI and a VLAN ID in the Ethernet frame. The VXLAN header includes a VNI to which the VLAN ID in the Ethernet frame is mapped. An application scenario of FIG. 11A and FIG. 11B is shown in FIG. 1, and an authentication process is shown in FIG. 3C.

The method shown in FIG. 11A and FIG. 11B includes the following step 111 to step 1118.

Step 111: A manager configures a mapping from a VLAN ID to a VNI on the network device 13. Similarly, the manager may also configure a mapping from a VLAN ID to a VNI on the network device 23. Optionally, on the network device 13 and the network device 23, VLAN IDs mapped to a same VNI may be the same or may be different.

Step 112: The network manager configures an IP address of the network device 13 on the access device 12 for LISP communication between the access device 12 and the network device 13. Likewise, the network manager configures an IP address of the network device 23 on the access device 22 for LISP communication between the access device 22 and the network device 23.

Step 113: The terminal 11 gets online using the access device 12, and triggers an authentication procedure of the terminal 11. The access device 12 receives, through a port E1/0/1, an authentication packet sent by the terminal 11.

The access device 12 creates an entry in a user information table. The entry includes a MAC address 00e0-d26b-8121 of the terminal 11 that is included in the authentication packet and the port E1/0/1 receiving the authentication packet. It may be understood that, in different authentication procedures, authentication packets sent by the terminal 11 to trigger the authentication procedures are different. Optionally, for example, in the standard 802.1X, the authentication packet sent by the terminal 11 is an EAPoL-Start packet (as shown in FIG. 3C).

Step 114: The access device 12 performs LISP encapsulation on the authentication packet sent by the terminal 11. To distinguish an LISP packet obtained through encapsulation from the LISP packets in the procedure shown in FIG. 7A and FIG. 7B, the LISP packet herein obtained through encapsulation is referred to as a third LISP packet. The access device 12 sends the third LISP packet to the network device 13.

To encapsulate the authentication packet using LISP, an LISP packet needs to be extended. A field structure of the LISP protocol is shown in FIG. 8. For descriptions of fields in FIG. 8, refer to an existing standard document, for example, RFC 6830. Details are not described herein. The third LISP packet in this embodiment is implemented by mainly extending and defining a "LISP Message" part in FIG. 8. Details are shown in FIG. 12.

In this embodiment, the authentication packet EAPoL-Start sent by the terminal 11 is encapsulated into a "LISP Message" part in the third LISP packet. As shown in FIG. 12, the "LISP Message" part in the third LISP packet includes a packet type indicator. The packet type indicator indicates that this LISP packet includes an authentication packet from a to-be-authenticated supplicant device. Optionally, the packet type indicator is represented by an integer, and stored in a Type field. In this embodiment, an integer "6" is used to indicate that this LISP packet includes an authentication packet from a to-be-authenticated supplicant device. Actually, a value of the packet type indicator and a location of the packet type indicator in the "LISP Message" part may be flexibly set, provided that both the access device and the network device can identify the packet type indicator based on a predefined format, to determine a purpose of the LISP packet. With the packet type indicator, the network device and the access device can identify an LISP packet used for encapsulating an authentication packet, to better assist in a terminal authentication process.

Figure 12:
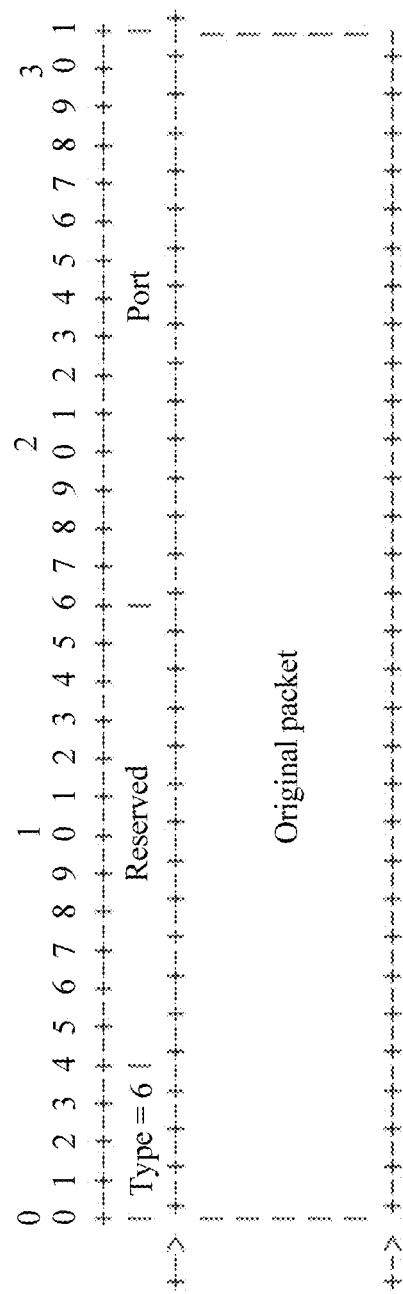
FIG. 12 is a schematic diagram of a second LISP packet extension manner according to an embodiment of this application.

Optionally, as shown in FIG. 12, the access device 12 encapsulates the authentication packet sent by the terminal 11 into an "Original packet" field in the "LISP Message" part.

Optionally, the "LISP Message" part may carry a port number, to implement better compatibility with an existing authentication procedure such that there is no difference from the existing authentication procedure from a perspective of the terminal device. In an embodiment, for an authentication packet (for example, the EAPoL-Start and a subsequently sent EAP Response or EAP Challenge Response) sent by the terminal device to a network side, the access device 12 adds a number of a port on the access device 12 to a "LISP Message" part. The port indicated by the port number is a port used when the access device 12 receives the authentication packet sent by the terminal 11. Optionally, the port number is carried in a "Port" field in FIG. 12.

Step 115: The network device 13 decapsulates a third LISP packet sent by the access device 12, to obtain the authentication packet encapsulated into the third LISP packet, namely, the authentication packet sent by the terminal 11.

Both the access device 12 and the network device 13 support the LISP packet extension manner shown in FIG. 12. The network device 13 may perform a decapsulation process corresponding to the foregoing encapsulation process, to obtain the authentication packet. In an embodiment, the network device 13 obtains the encapsulated authentication packet from the "LISP Message" part in the extended LISP packet in the format shown in FIG. 12.

Step 116: The network device 13 records a correspondence between a supplicant device address in the authentication packet and a port receiving the third LISP packet. In this embodiment, the network device 13 is connected to the access device 12 through a port E1/0/0, and receives the packet from the access device 12 through the port E1/0/0. The to-be-authenticated supplicant device address in the authentication packet is the MAC address 00e0-d26b-8121 of the terminal 11. Therefore, the network device records a correspondence between the MAC address 00e0-d26b-8121 of the terminal 11 and the port E1/0/0.

Step 117: The network device 13 performs an authentication process of the terminal 11 based on the authentication packet obtained through decapsulation.

In an embodiment, in the plurality of times of packet exchange in the authentication process, the network device 13 processes, according to the authentication procedure, a packet obtained after decapsulation, and encapsulates an authentication packet to be sent to the terminal 11 into an LISP packet in an extended field format, and sends the LISP packet obtained through encapsulation to the access device 12.

For example, referring to FIG. 3C, after decapsulating the third LISP packet sent by the access device 12 to obtain the EAPoL-Start packet sent by the terminal 11, the network device 13 generates an EAP Request packet, encapsulates the EAP Request packet into a "LISP Message" part in an LISP packet, and sends the LISP packet obtained through encapsulation to the access device 12.

For another example, referring to FIG. 3C, after decapsulating an LISP packet sent by the access device 12 to obtain the EAP Response packet, the network device 13 sends a RADIUS Access-Request packet to the authentication server. After receiving a RADIUS Access-Challenge packet returned by the authentication server, the network device 13 extracts an EAP Challenge Request packet from the RADIUS Access-Challenge packet, encapsulates the EAP Challenge Request packet into a "LISP Message" part in an LISP packet, and sends the LISP packet obtained after encapsulation to the access device 12.

For another example, referring to FIG. 3C, after decapsulating an extended LISP packet sent by the access device 12 to obtain the EAP Challenge Response packet, the network device 13 sends a RADIUS Access-Request packet to the authentication server. After receiving a RADIUS Access-Accept packet returned by the authentication server, the network device 13 extracts an EAP Success packet from the RADIUS Access-Accept packet, encapsulates the EAP Success packet into a "LISP Message" part in an LISP packet, and sends the LISP packet obtained after encapsulation to the access device 12.

In a process of performing LISP encapsulation on an authentication packet (for example, the EAP Request, the EAP Challenge Request, or the EAP Success), the network device 13 encapsulates the authentication packet into a "LISP Message" part in an LISP packet. As shown in FIG. 12, a "LISP Message" part in an extended LISP packet includes a packet type indicator used to indicate that this LISP packet is used to send an authentication packet from the authentication server. Optionally, the packet type indicator is represented by an integer, and stored in a Type field. The integer indicating that this LISP packet is used to send an authentication packet from the authentication server may be the same as or may be different from the integer indicating that this LISP packet is used to send an authentication packet from the to-be-authenticated supplicant device. In this embodiment, the same integer "6" is used to indicate that this LISP packet is used to send an authentication packet from the authentication server. In other words, a same packet type indicator may be used to indicate a transmitted authentication packet, regardless of whether the authentication packet is from the to-be-authenticated supplicant device or from the authentication server.

Optionally, as shown in FIG. 12, the access device 12 encapsulates the authentication packet to be sent to the terminal 11 into an "Original packet" field in the "LISP Message" part.

Optionally, the "LISP Message" part may carry a port number, to implement better compatibility with an existing authentication procedure such that there is no difference from the existing authentication procedure from a perspective of the terminal device. In an embodiment, for an authentication packet (for example, the EAP Request, the EAP Challenge Request, or the EAP Success) sent by the network device to the terminal device, the network device 13 adds a number of a port on the access device 12 to a "LISP Message" part. The port indicated by the port number is a port used when the access device 12 sends an authentication packet obtained after decapsulation to the terminal 11. Optionally, the port number is carried in a "Port" field in FIG. 12.

Step 118: After authenticating the terminal 11, the network device 13 obtains a MAC address 00e0-d26b-8121 and authorization information of the terminal 11 from a RADIUS Access-Accept packet sent by the authentication server 50, and obtains an authorized VLAN ID of the terminal 11, namely, a VLAN 10, from the authorization information.

Step 119: The network device 13 adds the port E1/0/0 to the VLAN 10 based on the correspondence recorded in step 116 and the MAC address 00e0-d26b-8121 and the VLAN 10 in the authorization information.

Step 1110: The network device 13 sends a fourth LISP packet to the access device 12. The fourth LISP packet carries the MAC address 00e0-d26b-8121 and the authorization information of the terminal 11, and the authorization information includes at least the VLAN ID.

To carry the MAC address 00e0-d26b-8121 and the authorization information of the terminal 11 using the fourth LISP packet, an LISP packet needs to be extended. In this embodiment, the "LISP Message" part in FIG. 8 is extended and defined. Details are shown in FIG. 13.

In this embodiment, a "LISP Message" part in the fourth LISP packet needs to carry at least the VLAN identifier "VLAN 10" of the terminal 11 and at least one of the MAC address 00e0-d26b-8121 and an IP address 100.1.1.1 of the terminal 11.

Figure 13:
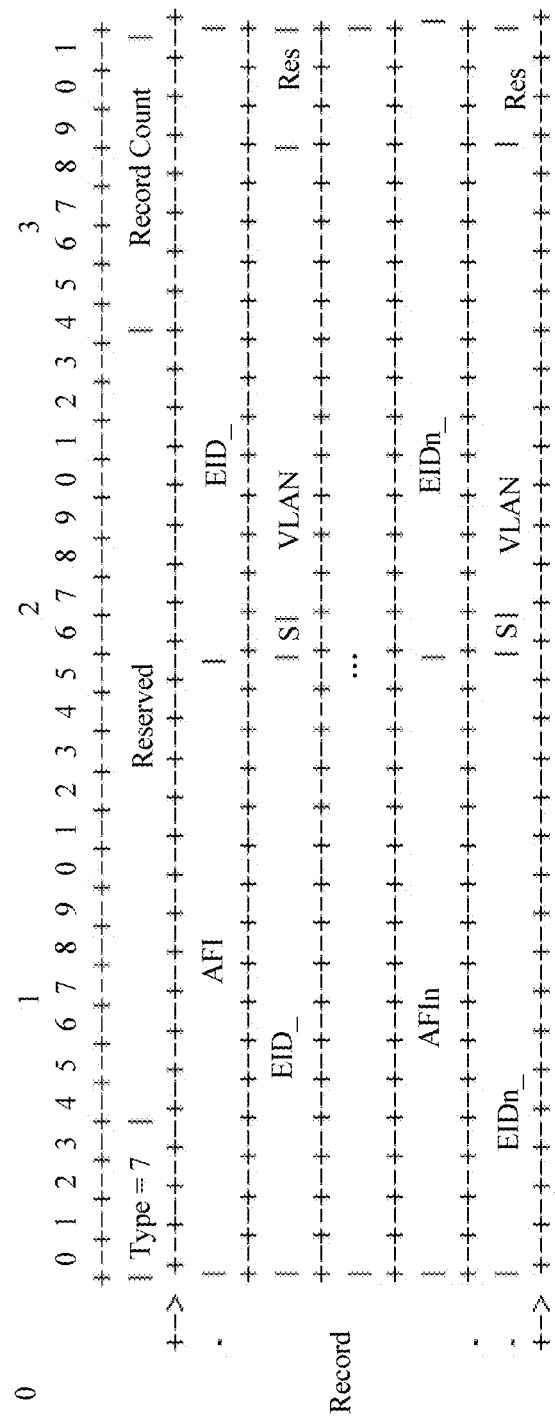
FIG. 13 is a schematic diagram of a third LISP packet extension manner according to an embodiment of this application.

As shown in FIG. 13, the "LISP Message" part in the fourth LISP packet includes a packet type indicator used to indicate that this LISP packet includes the MAC address of the terminal device and the VLAN ID. Optionally, the packet type indicator is represented by an integer, and stored in a Type field. For example, an integer "7" is used to indicate that this LISP packet is used to send the MAC address of the terminal device and the authorization information. Actually, a value of the packet type indicator and a location of the packet type indicator in the "LISP Message" part may be flexibly set, provided that both the access device and the network device can identify the packet type indicator based on a predefined format, to determine a purpose of the LISP packet. With the packet type indicator, the access device can identify the LISP packet used for encapsulating the MAC address and the authorization information, to obtain the MAC address and the authorization information from the LISP packet, and update the user information table.

Optionally, for ease of parsing, a Record field in the "LISP Message" part may be used to record a correspondence between an address and a VLAN identifier of a terminal. For example, a Record field may be used to record a correspondence between the address and the VLAN identifier of the terminal 11. In an embodiment, the address of the terminal 11 is carried in an endpoint identifier (EID) sub-field of the Record field, and the VLAN identifier "VLAN 10" is carried in a VLAN sub-field of the Record field. Optionally, if the authentication server 50 does not authorize the terminal 11, a value of the VLAN sub-field is set to 0.

Optionally, the access device may be further notified of a type of the address of the terminal device using the fourth LISP packet such that the access device directly performs parsing using a corresponding protocol stack, thereby improving efficiency of parsing the extended LISP packet by the access device to obtain the address of the user terminal, and efficiency of subsequent searching in the user information table.

Types of terminal device addresses include at least an IPv4 address, an IPv6 address, and a MAC address. Different address type indicators may be used to represent corresponding types of terminal device addresses. For example, a digit is used to represent a corresponding type of a terminal device address. For example, a digit 1 is used to represent the IPv4 address, a digit 2 is used to represent the IPv6 address, and a digit 16389 is used to represent the MAC address. In this embodiment, an address type indicator is carried in an AFI sub-field of the Record field, as shown in FIG. 13.

Optionally, the access device may be further notified of a terminal device authentication result using the fourth LISP packet. Different values of an authentication result indicator are used to indicate terminal device authentication results. For example, an integer 0 is used to indicate that authentication succeeds, and an integer 1 is used to indicate that authentication fails. In this embodiment, the authentication result indicator is carried in an S sub-field of the Record field, as shown in FIG. 13.

Optionally, when the access device 12 is connected to a relatively large quantity of terminal devices, a plurality of terminal devices connected to the access device 12 may all get online and authenticated within a short time. To improve efficiency of communication between the access device 12 and the network device 13, a plurality of correspondences between a terminal device and authorization information may be carried in a same fourth LISP packet. In this case, a Record Count field may be added to the "LISP Message" part in the fourth LISP packet, and a value of the field is used to indicate a quantity of Record fields carried in the LISP packet, as shown in FIG. 13.

Step 1111: After receiving the fourth LISP packet, the access device 12 obtains the MAC address 00e0-d26b-8121 and the VLAN 10 of the terminal 11 from the fourth LISP packet, and stores the authorization information of the terminal 11.

Step 1112: The access device 12 sets a default VLAN of the port E1/0/1 to the VLAN 10.

Optionally, the access device 12 parses the fourth LISP packet using the format shown in FIG. 13, to obtain the MAC address 00e0-d26b-8121 and the authorization information of the terminal 11 from the fourth LISP packet. The access device 12 finds, based on the MAC address 00e0-d26b-8121 of the terminal 11, the corresponding entry in the user information table shown in Table 3, and adds, to the entry, the authorization information, for example, the VLAN identifier "VLAN 10", obtained by parsing the fourth LISP packet.

The entry including the MAC address 00e0-d26b-8121 of the terminal 11 further includes the port E1/0/1 connected to the terminal 11. Adding the VLAN 10 to the entry means setting the default VLAN of the port E1/0/1 to the VLAN 10.

Step 1113: The terminal 11 accesses the terminal 21, and the access device 12 receives, through the port E1/0/1, an Ethernet frame sent by the terminal 11.

Step 1114: The access device 12 finds the default VLAN 10 of the port E1/0/1 based on a stored user information table, and adds the VLAN 10 to a VLAN tag field in the Ethernet frame sent by the terminal 11.

Step 1115: The access device 12 sends, to the network device 13, the Ethernet frame with the VLAN tag field to which the VLAN 10 is added.

Step 1116: The network device 13 receives the Ethernet frame through the port E1/0/0, and obtains, by querying the stored mapping (shown in Table 1) from a VLAN ID to a VNI based on the VLAN 10 included in the Ethernet frame, a VNI 1000 to which the VLAN 10 is mapped.

Step 1117: The network device 13 adds a VXLAN header to the received Ethernet frame to obtain a VXLAN packet, where a VNI field in the VXLAN header includes the found VNI 1000.

Step 1118: The network device 13 sends the VXLAN packet to the network device 23.

A process of processing, by the network device 23, a packet sent by the terminal 21 is similar to that of the network device 13, and is not repeatedly described herein.

An embodiment of this application further provides a VXLAN implementation system. The system includes a network device and an access device. The network device is connected to the access device, and the network device supports a VXLAN function. A terminal device accesses a network using the access device. A structure of the system is shown in FIG. 1. For working procedures and structures of the network device and the access device, refer to the descriptions in the foregoing embodiments.

All or some of the foregoing embodiments may be implemented using software, hardware, firmware, or any combination thereof. When being implemented using software, all or some of the embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

What is claimed is:

1. A Virtual eXtensible Local Area Network (VXLAN) method performed by a network device, comprising:
obtaining a mapping from a virtual local area network (VLAN) identifier (ID) to a VXLAN network identifier (VNI);
receiving a first authentication packet from an access device via a port of the network device, wherein the first authentication packet authenticates a supplicant device and comprises a supplicant device address of the supplicant device;
recording a correspondence between the port and the supplicant device address;
receiving a second authentication packet from an authentication server, wherein the second authentication packet comprises the supplicant device address and the VLAN ID of the supplicant device;
adding the port to a VLAN identified by the VLAN ID based on the supplicant device address, the VLAN ID, and the correspondence between the supplicant device address and the port;
receiving, via the port, an Ethernet frame from the access device, wherein a VLAN tag field in the Ethernet frame comprises the VLAN ID;
adding a VXLAN header to the Ethernet frame based on the VLAN ID and the mapping to obtain a VXLAN packet, wherein the VXLAN header comprises a VNI field carries the VNI; and
sending the VXLAN packet to another network device.

2. The VXLAN method of claim 1, further comprising sending a binding instruction to the access device, wherein the binding instruction comprises the supplicant device address and the VLAN ID.

3. The VXLAN method of claim 2, wherein the binding instruction is a second Locator/Identifier Separation Protocol (LISP) packet.

4. The VXLAN method of claim, wherein the second LISP packet carries a second packet type indicator indicating that the binding instruction includes a media access control (MAC) address and the VLAN ID.

5. The VXLAN method of claim 1, wherein the first authentication packet is a first Locator/Identifier Separation Protocol (LISP) packet.

6. The VXLAN of claim 5, wherein the first LISP packet further carries a first packet type indicator, and wherein the first packet type indicator indicates that the first LISP packet carries the first authentication packet.

7. A Virtual eXtensible Local Area Network (VXLAN) implementation method performed by an access device, comprising:
receiving a first authentication packet from a terminal device via a port of the access device;
recording a correspondence between the port and a media access control (MAC) address of the terminal device in the first authentication packet;
sending a second authentication packet to a network device;
receiving a binding instruction from the network device, wherein the binding instruction comprises the MAC address and a virtual local area network (VLAN) identifier (ID) of the terminal device; and
setting a default VLAN of the port to the VLAN ID based on the correspondence and the MAC address.

8. The VXLAN method of claim 7, further comprising:
receiving an Ethernet frame from the terminal device via the port, wherein a source address of the Ethernet frame is the MAC address;
adding a VLAN tag comprising the VLAN ID to the Ethernet frame based on the default VLAN; and
forwarding the Ethernet frame after adding the VLAN tag to the Ethernet frame.

9. The VXLAN method of claim 7, wherein the second authentication packet is a first Locator/Identifier Separation Protocol (LISP) packet.

10. The VXLAN method of claim 9, wherein first LISP packet carries a first packet type indicator indicating that the first LISP packet carries the second authentication packet.

11. The VXLAN method of claim 7, wherein the binding instruction is a second Locator/Identifier Separation Protocol (LISP) packet.

12. The VXLAN method of claim 11, wherein the second LISP packet carries a second packet type indicator indicating that the second LISP packet includes the MAC address and the VLAN ID.

13. A network device connected to an access device, comprising:
a first port;
a second port;
a third port;
a memory configured to store instructions; and
a processor coupled to the memory and configured to execute the instructions, which cause the processor to be configured to:
obtain a mapping from a virtual local area network (VLAN) identifier (ID) to a Virtual eXtensible Local Area Network (VXLAN) network identifier (VNI),
wherein the first port is configured to receive a first authentication packet from an access device, wherein the first authentication packet is used to authenticate a supplicant device and comprises a supplicant device address of the supplicant device;
record a correspondence between the first port and the supplicant device address,
wherein the second port is configured to receive a second authentication packet from an authentication server, wherein the second authentication packet comprises the supplicant device address and a VLAN ID of the supplicant device;
add the first port to a VLAN identified by the VLAN ID based on the supplicant device address and the VLAN ID and the correspondence between the supplicant device address and the first port, wherein the first port is further configured to receive an Ethernet frame from the access device, wherein a VLAN tag field in the Ethernet frame comprises the VLAN ID; and add a VXLAN header to the Ethernet frame based on the VLAN ID and the mapping to obtain a VXLAN packet, wherein the VXLAN header comprises a VNI field carries the VNI, wherein the third port is configured to send the VXLAN packet to another network device.

14. The network device of claim 13, wherein the first port is further configured to send a binding instruction to the access device, wherein the binding instruction comprises the supplicant device address and the VLAN ID.

15. The network device of claim 13, wherein the first authentication packet is a first Locator/Identifier Separation Protocol (LISP) packet, wherein the first LISP packet carries a first packet type indicator indicating that the first LISP packet carries the first authentication packet.

16. The network device of claim 13, wherein the binding instruction is a second LISP packet, wherein the second LISP packet carries a second packet type indicator indicating that the second LISP packet includes a MAC address of the supplicant device and the VLAN ID.

17. An access device, comprising:
a first port configured to receive an authentication packet from a terminal device;
a second port;
a third port;
a memory configured to store instructions; and
a processor coupled to the memory and configured to execute the instructions, which cause the processor to be configured to record a correspondence between the first port and a Media Access Control (MAC) address of the terminal device in the authentication packet;

wherein the second port is configured to:
send the authentication packet to a network device; and
receive a binding instruction from the network device, wherein the binding instruction comprises the MAC address and a virtual local area network (VLAN) identifier (ID) of the terminal device; and wherein the instructions further cause the processor to be configured to set a default VLAN of the first port to the VLAN ID based on the correspondence and the MAC address.

18. The access device of claim 17, wherein the first port is further configured to receive an Ethernet frame from the terminal device, wherein a source address of the Ethernet frame is the MAC address, and wherein the instructions further cause the processor to be configured to:
add a VLAN tag comprising the VLAN ID to the Ethernet frame based on the default VLAN; and
forward the Ethernet frame through the second port after adding the VLAN tag to the Ethernet frame.

19. The access device of claim 17, wherein the authentication packet is a first Locator/Identifier Separation Protocol (LISP) packet, wherein the first LISP packet is carries a first packet type indicator indicating that the first LISP packet carries the authentication packet.

20. The access device of claim 17, wherein the binding instruction is a second LISP packet, wherein the second LISP packet carries a second packet type indicator indicating that the second LISP packet includes the MAC address and the VLAN ID.

* * * * *